US011034599B2

(12) United States Patent
Rytwo et al.

(10) Patent No.: US 11,034,599 B2
(45) Date of Patent: Jun. 15, 2021

(54) SYSTEM FOR TREATMENT OF POLLUTED EFFLUENTS

(71) Applicant: GAVISH-GALILEE BIO APPLICATIONS, LTD., Kyriat Shmona (IL)

(72) Inventors: Giora Rytwo, Sde Nehemia (IL); Gonen Daskal, Kibbutz Kfar Hanasi (IL)

(73) Assignee: GAVISH-GALILEE BIO APPLICATIONS LTD, Kyriat Shmona (IL)

( * ) Notice: Subject to any disclaimer, the term of this patent is extended or adjusted under 35 U.S.C. 154(b) by 630 days.

(21) Appl. No.: 15/512,516

(22) PCT Filed: Sep. 17, 2015

(86) PCT No.: PCT/IL2015/050944
§ 371 (c)(1),
(2) Date: Mar. 17, 2017

(87) PCT Pub. No.: WO2016/042558
PCT Pub. Date: Mar. 24, 2016

(65) Prior Publication Data
US 2017/0297933 A1 Oct. 19, 2017

(30) Foreign Application Priority Data

Sep. 18, 2014 (GB) .................................. 1416495

(51) Int. Cl.
*C02F 1/72* (2006.01)
*B01D 65/02* (2006.01)
(Continued)

(52) U.S. Cl.
CPC ............. *C02F 1/725* (2013.01); *B01D 63/087* (2013.01); *B01D 65/02* (2013.01); *B01J 20/10* (2013.01);
(Continued)

(58) Field of Classification Search
CPC ............ B01D 2321/26; B01D 2321/30; B01D 63/087; B01D 65/02; B01J 20/10;
(Continued)

(56) References Cited

U.S. PATENT DOCUMENTS 3,256,995 A * 6/1966 Schmid ................ B01D 29/071
210/411
5,462,674 A * 10/1995 Butters ..................... C02F 1/325
210/321.69
(Continued)

FOREIGN PATENT DOCUMENTS

CN 103557559 A 2/2014
JP 2003265936 A 9/2003
(Continued)

OTHER PUBLICATIONS

Rytwo, G., et al., A Continuous-Flow Device for Photocatalytic Degradation and Full Mineralization of Priority Pollutants in Water, Desalination and Water Treatment, http://dx.doi.org/10.1080/19443994.2015.1077749, published online Aug. 10, 2015.
(Continued)

*Primary Examiner* — Dirk R Bass
(74) *Attorney, Agent, or Firm* — Knobbe Martens Olson & Bear, LLP

(57) ABSTRACT

A system for treatment of a polluted effluent, includes an outer chamber configured to treat the polluted effluent in mixture with a purification slurry including particles of one or more catalysts and/or organoclays, or a mixture thereof. The outer chamber includes (i) a stirring unit consisting of an engine and a stirrer, configured to mix the polluted effluent and the purification slurry to prevent the particles from sinking without causing a turbulence, (ii) a membrane located at the top of the outer chamber through which a treated effluent passes, while preventing the particles of one or more catalysts and/or organoclays from exiting the outer chamber together with the treated effluent, (iii) a membrane cleaning system configured to remove and collect the particles of one or more catalysts and/or organoclays accumu-
(Continued)

lated on the membrane, and re-introducing the particles back to the bottom of the outer chamber.

18 Claims, 21 Drawing Sheets

(51) Int. Cl.
| | |
|---|---|
| B01J 20/12 | (2006.01) |
| B01J 20/20 | (2006.01) |
| B01J 21/06 | (2006.01) |
| C02F 1/28 | (2006.01) |
| C02F 1/32 | (2006.01) |
| C02F 1/44 | (2006.01) |
| B01J 35/00 | (2006.01) |
| B01D 63/08 | (2006.01) |
| B01J 20/10 | (2006.01) |
| C02F 101/30 | (2006.01) |
| C02F 101/34 | (2006.01) |
| C02F 101/32 | (2006.01) |

(52) U.S. Cl.
CPC .............. *B01J 20/12* (2013.01); *B01J 20/20* (2013.01); *B01J 21/063* (2013.01); *B01J 35/004* (2013.01); *C02F 1/281* (2013.01); *C02F 1/32* (2013.01); *C02F 1/325* (2013.01); *C02F 1/44* (2013.01); *B01D 2321/26* (2013.01); *B01D 2321/30* (2013.01); *C02F 1/283* (2013.01); *C02F 2101/306* (2013.01); *C02F 2101/308* (2013.01); *C02F 2101/327* (2013.01); *C02F 2101/345* (2013.01); *C02F 2303/16* (2013.01); *C02F 2305/10* (2013.01)

(58) Field of Classification Search
CPC . B01J 20/12; B01J 20/20; B01J 21/063; B01J 35/004; C02F 1/001; C02F 1/281; C02F 1/283; C02F 1/285; C02F 1/288; C02F 1/32; C02F 1/325; C02F 1/44; C02F 1/444; C02F 1/66; C02F 1/70; C02F 1/72; C02F 1/722; C02F 1/725; C02F 2101/306; C02F 2101/308; C02F 2101/327; C02F 2101/345; C02F 2103/343; C02F 2201/3223; C02F 2201/3226; C02F 2201/3228; C02F 2209/005; C02F 2209/02; C02F 2209/04; C02F 2209/05; C02F 2209/06; C02F 2209/22; C02F 2209/24; C02F 2301/022; C02F 2301/08; C02F 2303/16; C02F 2303/18; C02F 2303/22; C02F 2303/24; C02F 2305/10

See application file for complete search history.

(56) References Cited

U.S. PATENT DOCUMENTS

| | | | | |
|---|---|---|---|---|
| 6,117,337 | A * | 9/2000 | Gonzalez-Martin | ........................ B01D 53/864 210/748.14 |
| 7,326,330 | B2 * | 2/2008 | Herrington | .......... B01J 19/0026 205/759 |
| 7,837,952 | B2 * | 11/2010 | Butters | ..................... C02F 1/32 210/748.01 |
| 2005/0194326 | A1 | 9/2005 | Calabrese | |
| 2008/0237145 | A1 | 10/2008 | Jefferson et al. | |
| 2015/0090660 | A1 * | 4/2015 | Dotson | ................... C02F 1/325 210/636 |
| 2015/0096941 | A1 * | 4/2015 | Doudrick | ................. C02F 1/70 210/739 |

FOREIGN PATENT DOCUMENTS

| | | |
|---|---|---|
| WO | 2012059746 A2 | 5/2012 |
| WO | 2013175150 A1 | 11/2013 |

OTHER PUBLICATIONS

Rytwo, G., et al., Very Fast Sorbent for Organic Dyes and Pollutants, Colloid and Polymer Science 284:817-820, Apr. 2006.
International Preliminary Report on Patentability and Written Opinion received in corresponding PCT/IL2015/050944 dated Mar. 21, 2017.
Benotti, M.J., et al., Evaluation of a Photocatalytic Reactor Membrane Pilot System for the Removal of Pharmaceuticals and Endocrine Disrupting Compounds from Water, Water Res. S1-S17, 43:1513-1522, 2009.
Chong, M.N., et al., Recent Developments in Photocatalytic Water Treatment Technology: A Review, Water Research. 44:2997-3027, 2010.
He, H.Y., Photo-Catalytic Degradation of Methyl Orange in Water on CuS-Cu2S Powders, Int. J. Environ. Res. 2 (1):23-26, 2008.
Meng, Y., et al., Treatment of Polluted River Water With a Photocatalytic Slurry Reactor Using Low-Pressure Mercury Lamps Coupled With a Membrane, Desalination 181:121-133, 2005.
Moctezuma, E., et al., Photocatalytic Degradation of Paracetamol: Intermediates and Total Reaction Mechanism, Journal of Hazardous Materials 243:130-138, 2012.
Mortland, M.M., et al., Clay-Organic Complexes as Adsorbents for Phenol and Chlorophenols, Clays Clay Minerals. 34(5):581-585, 1986.
Mozia, S., et al., A New Photocatalytic Membrane Reactor (PMR) for Removal of Azo-Dye Acid Red 18 From Water, Applied Catalysis B: Environmental 59:131-137, 2005.
Pozzo, R.L., et al., The Performance in a Fluidized Bed Reactor of Photocatalysts Immobilized Onto Inert Supports, Catalysis Today 62:175-187, 2000.
Rytwo, G., and Y. Gonen, Functionalized Activated Carbons for the Removal of Inorganic Pollutants, Desalination and Water Treatment 11:318-323, 2009.
Rytwo, G., et al., A Continuous-Flow Device for Photocatalytic Degradation and Full Mineralization of Priority Pollutants in Water, Desalination and Water Treatment, Taylor & Francis, published online Aug. 10, 2015, 12 pages.
Rytwo, G., et al., Interactions of Monovalent Organic Cations With Montmorillonite: Adsorption Studies and Model Calculations, Division S-9-Soil Mineralogy, Soil Sci. Soc. Am. J. 59:554-564, 1995.
Rytwo, G., et al., Very Fast Sorbent for Organic Dyes and Pollutants, Colloid Polym Sci 284:817-820, 2006.
White, D.P., Chemistry: The Central Science, 9th Ed., Chapter 14, Chemical Kinetics, Prentice-Hall, 2003.
Zhu, L., et al., Sorption of Phenol, p-Nitrophenol, and Aniline to Dual-Cation Organobentonites from Water, Environ. Sci. Technol., 34:468-475, 2000.
Sun, D.D., Photocatalytic Degradation of E. coliform in Water, Water Research 37:3452-3462, 2003.

* cited by examiner

SYSTEM FOR TREATMENT OF POLLUTED EFFLUENTS

FIELD OF THE INVENTION

The present invention relates in general to the treatment of polluted effluent, in particular, to a system comprising an outer chamber, a membrane and a membrane cleaning unit for the removal of priority pollutants in water.

BACKGROUND OF THE INVENTION

Pollutants in water are a known problem. Especially when dealing with hazardous chemicals, also known as "priority pollutants", which are harmful to human health and/or to the environment. Standard techniques used to remove such pollutants from water often result in the creation of a polluted sludge, which needs to be disposed of as hazardous waste.

On the other hand, photocatalytic degradation process might allow full mineralization of the pollutant with zero discharge of hazardous wastes. However, current devices performing such photocatalytic degradation processes usually suffer from low efficiency due to technical problems that hinder efficient contact between: (i) the pollutant, (ii) the light and (iii) the catalyst. The system of the present invention aims to optimize such contact and allow photodegradation while the polluted effluent continuously flows through the system.

Advanced oxidation processes (AOPs) have proved to be one of the most effective methods for water treatment (He, 2008). In general AOPs are based on the in situ generation of highly reactive transitory species (i.e. $H_2O_2$, $OH.$, $O_2^-.$, $O_3$, etc.) in order to perform mineralization of refractory organic compounds and other pollutants. Among AOPs, heterogeneous photocatalysis has demonstrated its efficiency in degrading a wide range of refractory organics into biodegradable compounds, and in some cases even yield complete mineralization to carbon dioxide and water.

The most widely applied photocatalyst in water treatment is Degussa P-25 $TiO_2$, which consists of 80% anatase and 20% rutile with a surface area of 50 $m^2/g$. However, many other metal oxides, semiconductors or minerals can be used, such as ZnO, $Fe_2O_3$, CdS, GaP and ZnS, clay minerals, zeolites, pillared clays and even pillared clays based on $TiO_2$ pillars.

The efficiency of photocatalysis is due to a series of chain oxidative/reductive reactions occurring at the photon activated surface. For example, the photon energy (hu) for $TiO_2$ should be greater than or equal to the bandgap energy of $TiO_2$ (usually 3.2 eV for anatase or 3.0 eV for rutile), causing the lone electron to be photoexcited to the empty conduction band in femtoseconds. The photonic excitation leaves behind an empty unfilled valence band, and thus creating the electron-hole pair. The following series of chain oxidative/reductive reactions is postulated as including several stages (based on Chong et al., 2010): (1) photoexcitation, (2) charge-carrier trapping of an electron, (3) charge-carrier trapping of a "hole", (4) electron-hole recombination including release of heat, (5) photoexcited electron scavenging forming superoxide, (6) oxidation of hydroxyls forming hydroxyl radicals ($OH^-.$), which is considered a potent degrading agent, (7) photodegradation by $OH^-.$, (8) direct photoholes attacks forming intermediates or final degradation products, (9) protonation of superoxides forming hydroperoxyl radicals ($HO_2.$), (10) combinations of hydroperoxyl radicals with electrons forming $HOO^-$, and (11) $HOO^-$ reaction with protons forming hydrogen peroxide ($H_2O_2$).

Thus, photodegradation processes form very active chemical species, which are able to rapidly and efficiently perform oxidation on other molecules, such as organic pollutants. The ability to induce the above described series of reductive/oxidative reactions to efficiently perform photocatalysis depends on the presence of electron scavengers that imped stage (4), and the recombination of electrons and holes. Thus, the presence of dissolved oxygen in the water is essential to allow stage (5) and the subsequent oxidation/reduction steps.

When preparing operational devices based on AOP, the overall heterogeneous photocatalysis process should be considered. This overall process can be separated into five independent steps (based on Hermann, 1999): (1) transfer of the reactants in the fluid phase to the surface; (2) adsorption of at least one of the reactants to said surface; (3) reaction in the adsorbed phase; (4) desorption of the product(s); and (5) removal of the resulting products from the interface region. Since mass transfer steps (1) and (5) can be easily controlled, enhancing the contact between the compounds and the catalysts (i.e. steps 2-4) is essential to induce a faster process. This can be done by dispersing the catalyst on a vast volume of polluted effluent. However, absorption of the photons simultaneously with the absorption of the pollutant on the catalyst is crucial for the process, and therefore light must be supplied to the catalyst-containing effluent in order to increase the rate of the process.

Photocatalytic reactors for water treatment are classified into two main configurations: (1) reactors with suspended photocatalyst particles; and (2) reactors with photocatalyst immobilized onto an inert carrier. The second configuration allows a relatively simpler continuous operation, whereas the first configuration requires an additional separation unit for the recovery of the photocatalyst particles. Since the limiting factor for both types of reactors is the contact between (i) the effluent; (ii) the catalyst; and (iii) the light, a slurry-type photocatalytic reactor of the first configuration might yield higher rates. However, as noted above, such a slurry-type photocatalytic reactor also requires an additional step of separation of the photocatalyst particles. Although this problem can be overcome by the use of settling tanks, the device/system also requires the use of coagulants and flocculants to precipitate the photocatalyst particles (Pozzo et al., 2000).

Another known solution is the application of hybrid photocatalysis/membrane processes, known as "photocatalytic membrane reactors" (PMRs) (Meng et al., 2005). PMRs may be based on immobilized catalysts, so that the photocatalysis occurs on the surface of the membranes or in its pores. However, in continuous operation, intermittent backwash must be used in order to retard membrane fouling, wherein one of the main foulants on the membrane surface is the catalyst itself. Accordingly, sequential rinsing with water and sodium hypochlorite are required to partly recover the permeability of the membrane.

An additional setup suggested in order to obtain the advantages of photocatalytic slurry on one hand while allowing efficient slurry separation on the other hand, is the use of "membrane distillation" (MD), which is a process of evaporation of feed volatile components through a porous hydrophobic membrane (Mozia et al., 2005).

The Photo-Cat™ system (manufactured by Purifics Inc., Ontario. London, and covered by U.S. Pat. Nos. 5,462,674, 5,554,300, 5,589,078, 6,136,203, and 6,215,126) is one example of a slurry-type photocatalysis reactor. In this system, the water stream passes through a pre-filter bag and a cartridge filter before being mixed with a nanoparticle TiO₂ slurry stream. The mixed stream then passes through a reactor with 32 UV lamps aligned in series, which can be individually controlled for the varying water quality. A cross-flow ceramic membrane TiO₂ recovery unit is hybridized downstream of the reactor to remove the catalyst from the flow stream, allowing the treated water to exit. The TiO₂ stream is recycled and remixed with a fresh TiO₂ slurry stream that enters the reactor stream (Chong et al., 2010). In order to prevent fouling, every 60 seconds the TiO₂ recovery unit is back-pulsed with air for 0.5 seconds. A small amount of the flow, containing all the rejected TiO₂, is returned to the untreated water in the TiO₂ slurry. However, when tested, the Photo-Cat™ system exhibited similar efficiencies for both photocatalytic reactor membrane mode and regular photolytic mode (Benotti et al., 2009).

In view of the above, the main object of the present invention is to develop a device for efficient photocatalytic degradation of pollutants, by allowing vast contact between the catalyst, the pollutant, and photons (light). This object of the invention as well as other objects will become apparent to those skilled in the art when the following detailed description of the invention is read in conjunction with the accompanying drawings and claims.

BRIEF DESCRIPTION OF THE DRAWINGS

The invention will be better understood upon reading the following non limiting description of certain embodiments of the invention, reference being made to the accompanying drawings, in which.

DETAILED DESCRIPTION OF THE INVENTION

Figure 1B:
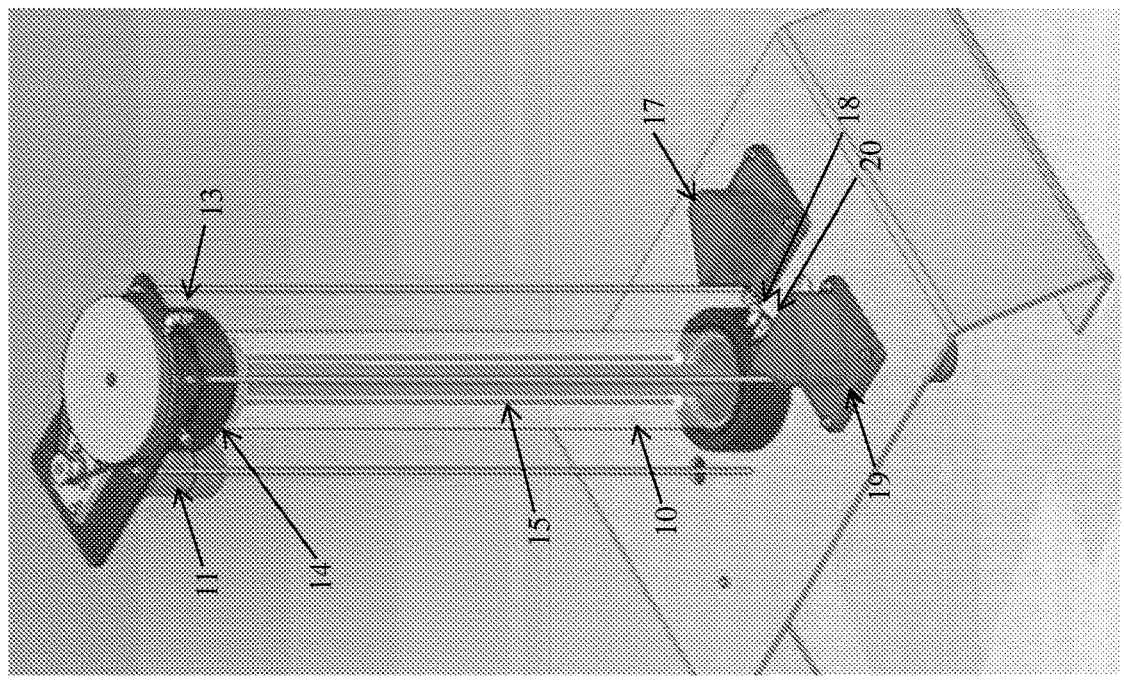
FIGS. 1A-B illustrate a general structure of a polluted effluent treatment system according to the invention: (A) rear view, and (B) front view.

An object of the present invention is to provide a system and method for purifying a polluted effluent, such as polluted water. According to the system of the invention, polluted effluent is passed through a flow chamber 10 while being admixed with a purification-slurry.

In certain embodiments, the polluted effluent treatment system of the invention comprises:
a. an outer chamber 10 for treating the polluted effluent in mixture with a purification slurry comprising particles of one or more catalysts and/or organoclays, or a mixture thereof, said outer chamber 10 comprising:
  (i) a stirring unit consisting of an engine 11 and stirring means 16, for mixing the polluted effluent and the purification slurry to prevent said particles from sinking without causing a turbulence;
  (ii) a membrane 22 located at the top of the outer chamber 10 through which treated effluent passes, while preventing said particles of one or more catalysts and/or organoclays from exiting the outer chamber 10 together with the treated effluent;
  (iii) a membrane cleaning system 14 for removing and collecting said particles of one or more catalysts and/or organoclays accumulated on the membrane 22, and re-introducing said particles back to the bottom of the outer chamber 10, said membrane cleaning system 14 comprises:
    (1) suction means 14 for removing particles accumulated on the membrane 22 by inversion of the flow direction of the effluent/catalyst mixture;
    (2) an engine 11a for rotating said suction means 14 across said membrane 22; and
    (3) collection means 23 for collecting the removed particles, which is fluidly connected to (a) said suction means 14; and (b) a tube for transferring the collected particles;
  (iv) at least one inlet 18,20 located at the bottom of the outer chamber 10, from which polluted effluent and/or purification slurry enter the outer chamber 10;
  (v) optional inlet(s) 21 for adding auxiliary compounds into the outer chamber 10;
  (vi) optional opening for holding sensors monitoring the performance of the system; and
  (vii) an outlet 13 at the top of the outer chamber 10 from which the treated effluent exits the outer chamber 10; and
b. a computerized control system for controlling the speed of flow of both the effluent and the purification slurry, and monitoring the pollutant(s) level in the treated effluent.

In a specific embodiment, the above system further comprises an inner chamber located inside the outer chamber 10. In yet another specific embodiment, said inner chamber is transparent and is designed to hold a lamp 15.

Another object of the present invention is to provide a system and method for photocatalytic degradation of polluted effluent, such as polluted water, and for full mineralization of priority pollutants in said polluted effluent. According to the system of the invention, polluted effluent is passed through an outer flow chamber 10 while being admixed with a catalyst(s)-slurry. Then, the flowing mixture is evenly and continuously exposed to UV light emitted from a lamp 15, such as a UV lamp, located in an inner chamber. The UV light initiates the photocatalytic processes which results in the production of highly reactive transitory species that interact with the pollutants in the effluent to mineralize them.

As aforesaid, the polluted effluent treatment system and method according to the invention is intended for removing priority pollutants from polluted effluent, such as polluted water, by photocatalytic degradation and mineralization of pollutants in the effluent, such as priority pollutants, by allowing massive contact between the pollutant(s), the catalyst(s), and photons (i.e. light).

One purpose of the present invention is to provide an efficient, cost effective, and low cost system and method for the continuous photodegradation of pollutants, such as organic and inorganic pollutants.

In certain embodiments, the polluted effluent photocatalysis treatment system of the invention comprises:
(i) an outer chamber 10 for treating the polluted effluent in mixture with a purification slurry comprising particles of one or more catalysts, said outer chamber 10 comprising:
  (a) a stirring unit consisting of an engine 11 and stirring means 16, such as rods, for mixing the polluted effluent and the purification slurry to prevent the particles from sinking without causing a turbulence;
  (b) a membrane 22 located at the top of the outer chamber 10 through which treated effluent passes, while preventing said catalyst particles from exiting the outer chamber 10 together with the treated effluent;
  (c) a membrane cleaning system 14 for removing, collecting and re-introducing catalyst particles accumulated on the membrane 22 back to the bottom of the outer chamber 10, said membrane cleaning system 14 comprising:
    (1) suction means 14 for removing catalyst particles accumulated on the membrane 22 by inversion of the flow direction of the effluent/catalyst mixture;
    (2) an engine 11a for rotating said suction means 14 across said membrane 22;
    (3) collection means 23 for collecting the removed catalyst particles, which is fluidly connected to (a) said suction means 14; and (b) a tube for transferring the collected catalyst particles;
  (d) at least one inlet 18,20 located at the bottom of the chamber 10, from which polluted effluent and/or catalyst slurry enter the chamber;
  (e) at least one inlet 21 located at the bottom of the chamber 10, to which auxiliary compounds and/or oxygen pumps may be attached;
  (f) an opening for holding sensors monitoring the performance of the system; and
  (g) an outlet 13 at the top of the outer chamber 10 from which the treated effluent exits the outer chamber 10;
(ii) a transparent inner chamber for holding a lamp 15, located inside the outer chamber 10; and
(iii) a computerized control system for controlling the speed of flow of both the effluent and the catalyst(s) slurry, and monitoring the pollutant(s) level in the treated water.

It should be noted that the term "performance" as used throughout the application refers to the ability of the system of the invention to remove and/or reduce the amount of pollutants in a polluted effluent. This term is measured in terms of clearance speed and degree, final concentration of pollutants, amount of particles of catalyst(s) and/or organoclays used during the purification process, amount of particles of catalyst(s) and/or organoclays which can be re-used at the end of the purification process, etc.

In certain embodiments, the present invention provides a continuous flow device for photocatalytic degradation and full mineralization of priority pollutants in a polluted effluent.

"Polluted effluent" as used herein refers to water, wastewater or any other essentially transparent effluent. In certain embodiments, the polluted effluent as used herein has turbidities lower than 100 NTU. It should be noted that before the effluent enters the system of the invention it must be filtered in order reduce to a minimum the amount of suspended solids and by that improve the light transmission in the chamber, and avoid unnecessary clogging of the membrane 22 inside the system that may contaminate or block the different tubes of the system.

Pollutants that can be removed by the system of the invention from polluted effluent include, but are not limited to, anionic or cationic dyes, various pharmaceuticals, phenols and polyphenols, and pesticides. Accordingly, in certain embodiments of the invention the effluent pollutants which can be removed by the system of the invention are selected from: anionic or cationic dyes, pharmaceuticals, phenols, polyphenols, pesticides, and any combination thereof. It should be noted that the system of the invention can treat any pollutant that its degradation is accelerated by a heterogeneous photocatalysis performed by combination of light with or without catalyst slurry.

The catalyst(s) used in the system of the invention are selected based upon the pollutant to be treated. Examples of catalysts that can be utilized in the system of the invention for treating polluted effluent include, but are not limited to. $TiO_2$, raw and Cu exchanged SWy-2 montmorillonite, SHCa-1 hectorite, and Li-synthetic hectorite. Accordingly, in certain embodiments, the catalyst in the catalyst(s)-slurry used in the system of the invention is selected from: $TiO_2$, ZnO, $Fe_2O_3$, CdS, GaP and ZnS, clay minerals, zeolites, pillared clays, and any combination thereof.

In order for the system of the invention to be effective, the contact between the pollutant, the catalyst and the light, must be optimal. In order to achieve this goal, the system is designed to keep the polluted effluent and catalyst mixture as homogenous as possible as it passes through the outer chamber 10. Accordingly, in certain embodiments, the concentration of the catalyst in the outer chamber 10 in the system of the invention remains essentially constant in the entire chamber. For instance, the catalyst's concentration in the effluent may be from about 0.01 to about 1 g/L; from about 0.05 to about 0.5 g/L; from about 0.1 to about 0.35 g/L, or from about 0.15 to about 0.5 g/L.

It should be noted that if the treated effluent still contains traces of the pollutant(s), it is possible to re-introduce the treated effluent back into the system of the invention for an additional treatment. Accordingly, in certain embodiments the treated effluent exiting from the outlet at the top of the outer chamber 10 of the system of the invention is returned to the inlet at the bottom of the chamber for an additional treatment. This additional treatment can be conducted any number of times as necessary.

In certain embodiments, the present invention provides a tandem system for treatment of polluted effluent by photocatalysis, said system comprising at least two systems according to the invention connected in tandem.

In certain embodiments, each system of the invention in said tandem system is designed to treat a different pollutant. In certain embodiments, each system of the invention in said tandem system may comprise a different catalyst and/or lamp and/or auxiliary compounds.

As presented in the following examples, complete mineralization of the pollutants is achieved when using the polluted effluent treatment system of the invention. It should be understood that the system of the invention is not limited to the examples herein below, and that it can be used with any catalyst(s)-slurry, and can be adjusted and optimized to remove specific pollutants from the water.

Accordingly, an embodiment of the present invention is a system for treatment of polluted effluent by photocatalysis, which fully mineralizes the pollutant(s) in the effluent.

The membrane in the system of the invention is selected based upon the pore size required to prevent passage of the catalyst being used. Accordingly, in certain embodiments, the system of the invention uses a high flow rate membrane having a pore size of from about 0.2 to about 1.5 microns. In certain embodiments, the membrane is a mesh membrane. In certain embodiments, the material of the membrane is adapted to the experimental conditions. e.g. pH, temperature, pollutant, effluent, etc. for example, the membrane can be made of polyethersulfone (PES) or cellulose acetate.

The treatment of the polluted effluent with the system of the invention may be improved by adding to the treated polluted effluent auxiliary compound(s), based upon the pollutant and/or the catalyst being used. Accordingly, in certain embodiments, the auxiliary compound added into the system of the invention is hydrogen peroxide ($H_2O_2$). In certain embodiments, the auxiliary compound added into the system of the invention is selected from acid or base for pH adjusting, and oxidants/reducing compounds.

Figure 1A:
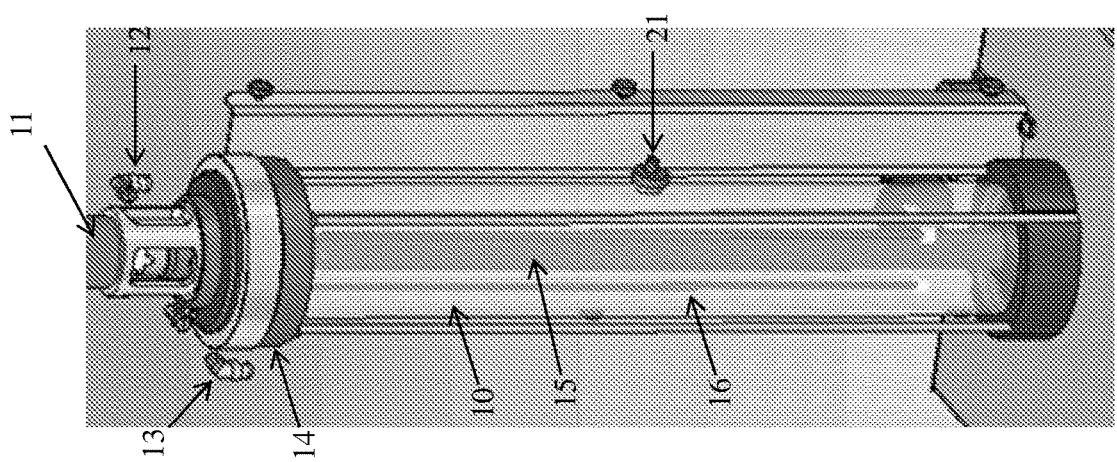

The polluted effluent treatment system of the present invention is schematically illustrated in FIGS. 1A-C. As can be seen, the system comprises mainly of (i) an inner chamber holding a lamp 15, (ii) an outer chamber 10 holding a mixture of the catalyst(s)-slurry and the polluted effluent, (iii) pumps 17,19, and (iv) a membrane 22 with a membrane cleaning system 14. Polluted effluent is pumped into the outer chamber 10 through an inlet 18 by a feeding pump 17. In the outer chamber 10 the polluted effluent is mixed with a catalyst(s)-slurry (such as $TiO_2$, clay, or any other suitable catalyst) which is pumped into the chamber through an inlet 20 by another pump 19. Alternatively, the catalyst(s)-slurry and the polluted effluent are mixed outside the outer chamber 10 and then pumped into the chamber, where the mixture is continuously mixed to ensure homogeneity of the mixture and avoid sinking of catalyst particles.

While flowing in the outer chamber 10, the polluted effluent and the catalyst-slurry mixture is gently mixed by stirring rods 16 attached to an engine 11. The mixture is irradiated by light emitted from a lamp 15, such as a UV lamp, placed within an inner chamber located throughout the center of the outer chamber 10 for even irradiation of the mixture all through the outer chamber 10. The engine 11 can be placed either on the top (FIG. 1a), on the side (FIG. 1b), or at the bottom of the chamber 10, depending on the type of engine and system design. The engine 11 may also be an external magnetic engine that magnetically stirs the metal or magnetic stirring rods placed within the outer chamber 10.

In order for light emitted from the lamp 15 in the inner chamber to reach the treated effluent, the material from which the inner chamber is made of has to be transparent to the wavelength of the lamp. Accordingly, in certain embodiments, the inner chamber in the system of the invention is made of transparent material, such as quartz glass, plastic, glass or crystal. Since different pollutants require different conditions for degradation and mineralization, such as different catalyst and light, it is an embodiment of the invention that the lamp inside the inner chamber may be chosen based upon the treated pollutant. Similarly, the material from which the inner chamber is made of may be selected according to the selected lamp and the needed wavelength and light intensity.

The outer chamber may be made of the same material as the inner chamber or from another material. The outer chamber may be transparent or not. The outer chamber may comprise a reflector layer or made of a reflecting material in order to return the light back into the polluted effluent. In certain embodiments, the inner chamber may comprise a one-way reflective layer so that the light emitted from the lamp returns from the inner layer of the outer chamber to the outer layer of the inner chamber and vice versa.

The main purpose of stirring the mixture is to prevent sinking of the catalyst particles and maintaining the mixture as homogenous as possible, without causing turbulence in the liquid, which might reduce the effectiveness of the system by shortening the retention time of pollutant molecules by moving them too fast from the bottom of the chamber to the top. The stirring rods 16 may be dismantled or removed from the system, e.g. when using nanometric size catalyst particles, since the flow of the effluent itself prevents the catalyst particles from sinking.

In certain embodiments, the engine 11 of the stirring unit is also the engine 11a of the membrane cleaning system 14.

Figure 2A:
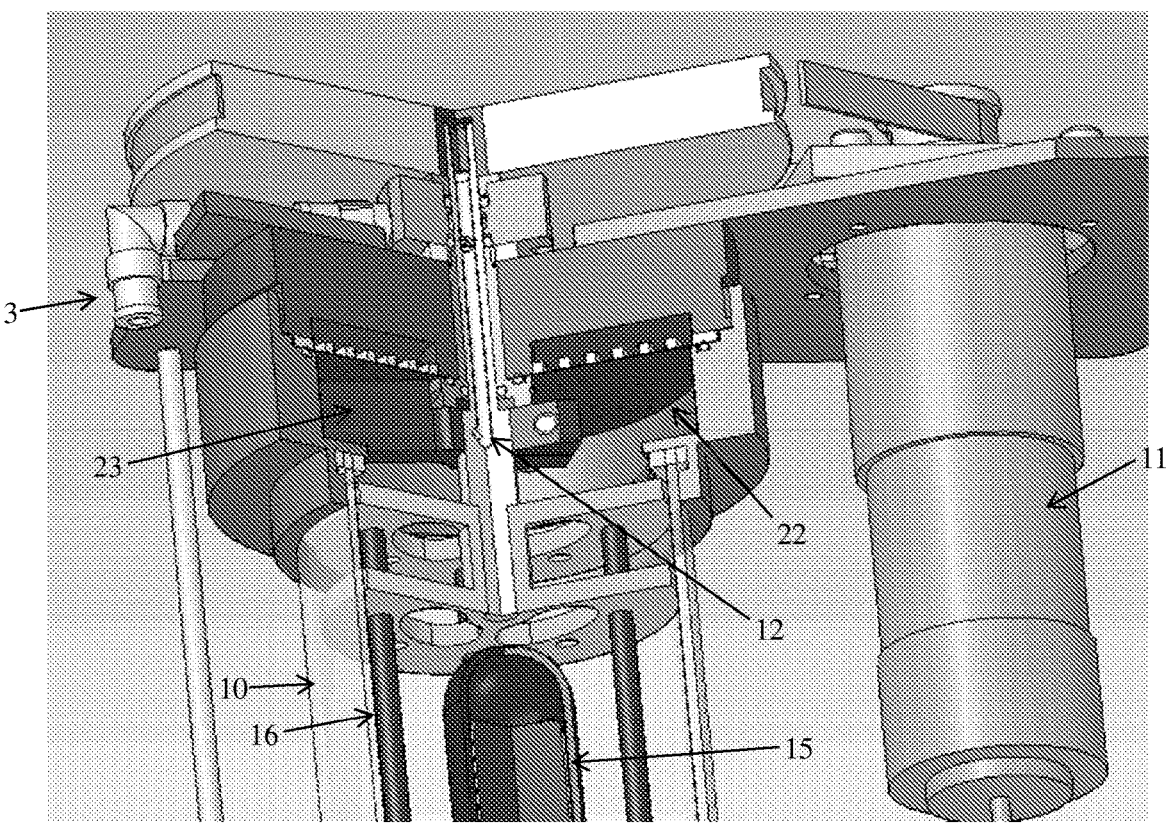
FIGS. 2A-B illustrate one possibility of the membrane cleaning system of the polluted effluent treatment system of the invention: (A) a 3-dimentional cross-section view; and (B) a side section view.
Figure 2B:
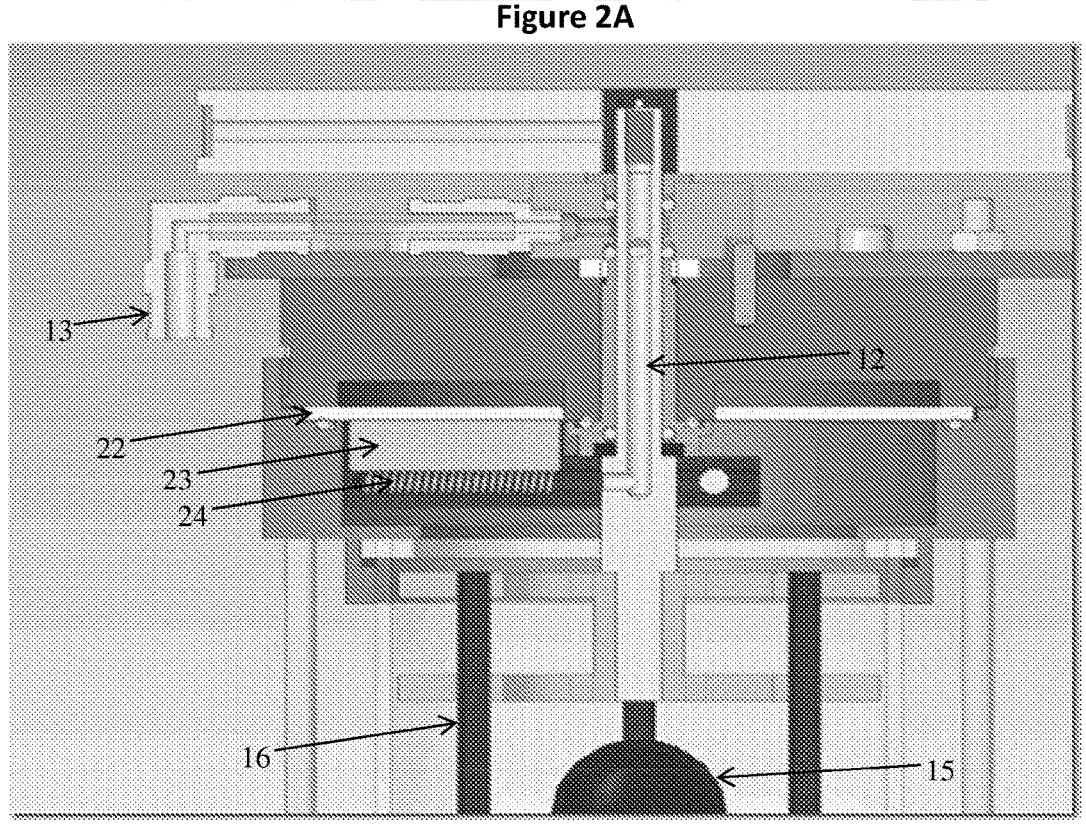

The mixture of polluted-effluent and catalyst(s)-slurry flows upward in the outer chamber 10 while being exposed to UV light. Before the mixture exits the outer chamber 10, it passes through a membrane 22 to which a membrane cleaning system 14 is attached. As detailed in FIG. 2, the membrane 22 slops the catalyst particles and prevents them from exiting the system together with the clean effluent. Meanwhile, the suction means of the membrane cleaning system 14 continuously sweeps over the membrane 22 and removes the accumulated catalyst particles from the membrane 22.

In certain embodiments, the membrane cleaning system 14 further comprises a rotating brush or wiper connected to the suction means 24 for physically removing particles of catalysts and/or organoclays accumulated on the membrane 22. In certain embodiments, said brush or wiper is hollow and constitutes the termini of the suction means 24.

In certain embodiments, the tube fluidly connected to the collection means 23 in the membrane cleaning system 14 allows to transfer the collected particles of catalyst(s) and/or organoclays to the bottom of the outer chamber 10 through the purification-slurry inlet or through a secondary inlet.

After removal from the membrane 22, the removed catalyst particles exit the outer chamber 10 through an outlet 12 in the membrane cleaning system 14, flow through a tube connected to the catalyst slurry inlet 20 at the bottom of the outer chamber 10, through which they re-enter the outer chamber 10. Additional auxiliary inlets/outlets 21 may be added to the outer chamber 10, at its bottom, center or top (an inlet 21 located at the middle of the outer chamber can be seen in FIG. 1A), for allowing a more efficient dispersion of the catalyst, introducing additional oxygen, adding other auxiliary compounds (e.g., $H_2O_2$), monitoring the performance of the system, etc.

In order to maintain the system of the invention efficient it may be constantly monitored, e.g. by sensors located within dedicated openings. In certain embodiments, the sensors in the system of the invention measure one or more of pH, temperature, and electrical conductivity of the effluent, catalyst(s) and/or organoclays concentration, pollutant concentration, light intensity, redox potential, oxygen concentration, and $CO_2$ concentration, and/or any other reaction-product concentration.

The operation of the system of the invention may by controlled by a computerized control system. In certain embodiments, the computerized control system controls the speed of flow of the polluted effluent entering the system, the amount of purification-slurry entering the system, the stirring speed, the quantity of air blown into the outer chamber if needed, the addition of auxiliary compound(s) if needed, and the wavelength and intensity of the light emitted from the lamp 15 in the inner chamber. For instance, the lamp may be a tunable laser lamp.

In certain embodiments, the inner chamber holding the lamp 15 is a cylinder of about 10-50 mm diameter, made from rigid transparent material, such as glass, quartz glass, crystal or plastic, as long as it ensures full transparency on the used light wavelength (such as different UV ranges) and does not chemically react with the effluent. In certain embodiments, the lamp 15 is a UV lamp having an effective wavelength of from about 240 to about 400 mm corresponding to photon energies of from about 5 to about 17 eV. In certain embodiments, the lamp 15 is a UV lamp having an effective length of about 370 mm, has an energy input of about 20 W, and has a light output of about 6.4 W at a wavelength of 254 nm (mercury lamp). The length of the inner chamber and the lamp 15 corresponds to the length of the outer chamber 10 and is designed to achieve maximum UV exposure of the polluted effluent throughout the entire length of the outer chamber 10. In certain embodiments, the lamp 15 is a tunable laser lamp.

In certain embodiments, the outer chamber 10 is a cylinder of at least about 400 mm in length, adapted to the size of the lamp length, and about 40-100 mm in diameter. In certain embodiments, the diameter of the outer chamber is about 66 mm, and the chamber flow diameter is 21 mm, yielding a flowing area of approximately 3000 $mm^2$ (30 $cm^2$). In certain embodiments, the outer chamber 10 is made of any rigid material and may or may not be transparent.

The main feeding pump 17 is electronically controlled and can deliver flows of from about 2 to about 20 $cm^3$/min thus providing a flowing velocity of from about 0.7 to about 7 mm/min. When considering the effective length of the lamp that yields irradiation times of 9 to 0.9 h, respectively, allowing large flexibility that might cover a wide range of pollutant concentrations. For some pollutants or pollutant-concentrations short irradiation times might be sufficient. For others, more "tough" to degrade or higher concentrated pollutants, larger irradiation times might be needed. The system of the invention allows the user at least one order of magnitude change in the irradiation time.

The membrane cleaning system 14 aims to avoid clogging of the membrane 22, as well as to keep the concentration of the catalyst particles in the effluent relatively constant. In certain embodiments, the membrane cleaning system 14 (FIG. 2) comprises a rotating means 23, such as a brush or a wiper, connected to a suction means 24. The rotating means 23 may be rotated by the same engine 11 that moves the stirring rods 16, or by another, separate, engine (11a not shown). The suction means 24 may be connected to the catalyst-slurry pump 19 which simultaneously pumps the catalyst-slurry into the outer chamber 10, while creating a vacuum that sucks the catalyst particles that accumulate on the membrane 22 and wiped by said rotating means 23. Alternatively, the suction means 24 may be connected to another pump (not shown) which creates a vacuum that sucks the catalyst particles that accumulate on the membrane 22, and pumps the collected catalyst particles back into the outer chamber 10 via the catalyst-slurry inlet 20 or via another separate inlet (not shown).

In certain embodiments, the cleaned and filtered outflow is pushed outside the outer chamber 10 by the flow pumped into the outer chamber 10 by the main feeding pump 17, whereas the catalyst slurry collected from the membrane 22 by the membrane cleaning system 14 is pumped and introduced hack into the bottom of the outer chamber 10.

Figure 20:
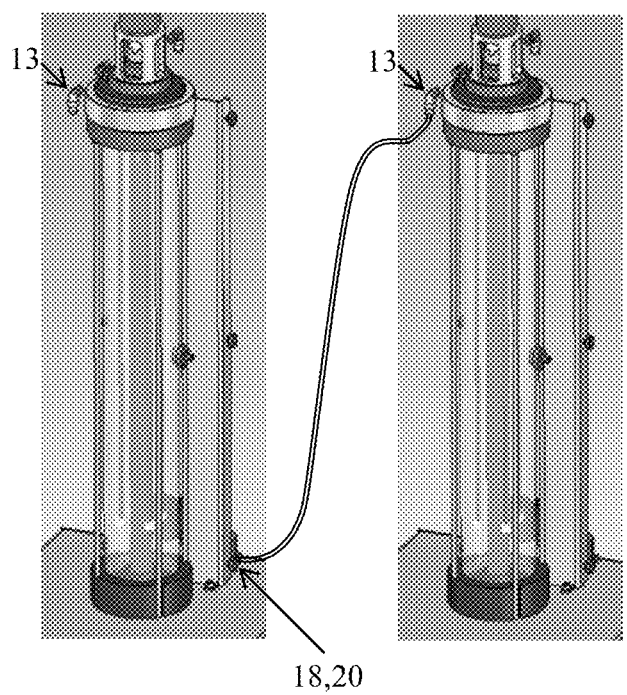
FIG. 20 is a general scheme illustrating an array of systems according to some embodiments of the invention.

In certain embodiments, the present invention provides an array of systems of the invention as described herein (see FIG. 20), for treatment of polluted effluent, said array of systems comprises at least two systems connected in tandem via a tube fluidly connected to (a) the collection means 23 in the membrane cleaning system 14 of a first system; and (b) at least one inlet 18,20 at the bottom of the outer chamber 10 of a second system. In specific embodiments, each system in such an array of system is designed to treat a different pollutant. Accordingly, each system comprises a different catalyst and/or organoclay and/or lamp and/or auxiliary compounds.

The present invention further provides methods for treating polluted effluent. Accordingly, in certain embodiments, the invention provides a method for treatment of a polluted effluent in the system of the invention, said method comprises:
a) filtering the effluent to remove large particles;
b) pumping the filtered polluted effluent into the bottom of the outer chamber 10;
c) pumping the purification-slurry to the bottom of the outer chamber 10;
d) mixing the polluted effluent and the purification-slurry in the outer chamber 10 without causing a turbulence;
e) if present, turning the light on and exposing the purification-slurry/effluent mixture to light;
f) monitoring the pollutant(s) concentration in the effluent in the outer chamber 10 and in the treated effluent exiting the outer chamber 10;
g) pumping auxiliary compounds and oxygen into the outer chamber 10 as needed;
h) cleaning the membrane 22 by removing therefrom particles of catalysts and/or organoclays, and transfering them to the bottom of the outer chamber 10 or to a collection chamber or designated drainage system; and
i) discharging the treated effluent exiting from the outer chamber 10 to a suitable system, such as the sewage system or an irrigation system or returning the treated effluent to the bottom of the outer chamber 10 for an additional treatment.

Figure 12:
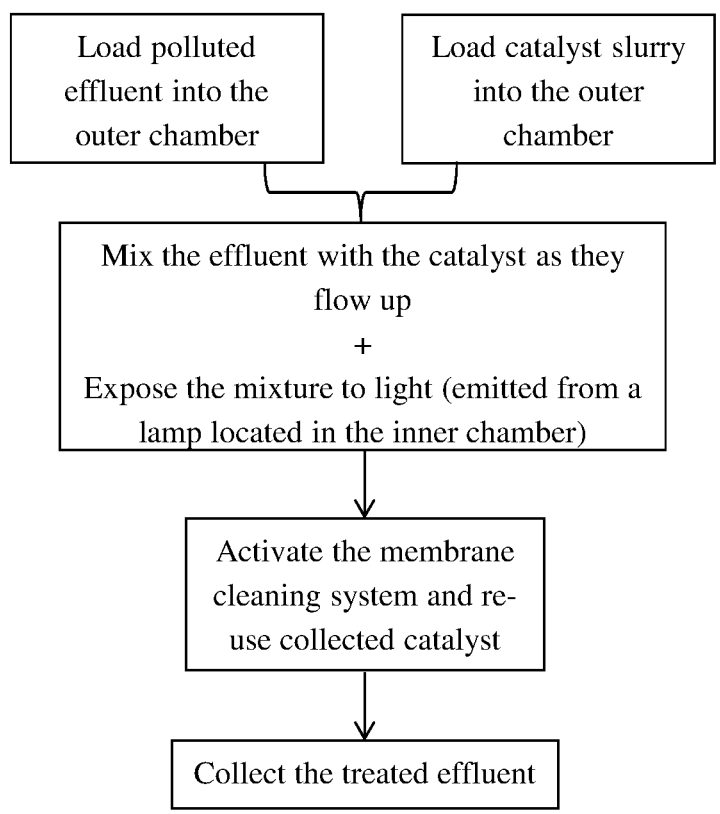
FIG. 12 is a scheme illustrating the method of photodegradating polluted water by using the system of the invention.

FIG. 12 schematically summarizes the above described method.

In certain embodiments, the invention provides a method for treatment of a polluted effluent in the array of systems of the invention, said method comprises:
a) filtering the effluent to remove large particles;
b) pumping the filtered polluted effluent to the bottom of the first outer chamber 10;
c) pumping the purification-slurry into the bottom of the first outer chamber 10;
d) mixing the polluted effluent and purification-slurry in the outer chamber 10 without causing a turbulence;
e) if present, turning the light on and exposing the purification-slurry/effluent mixture to light;
f) monitoring the pollutant(s) concentration in the effluent in the outer chamber 10 and in the treated effluent exiting the outer chamber 10;
g) pumping auxiliary compounds and oxygen into the outer chamber 10 as needed;
h) cleaning the membrane 22 by removing therefrom particles of catalysts and/or organoclays, and transfering them to the bottom of the outer chamber 10;
i) transferring the treated effluent to the outer chamber 10 of the subsequent system for an additional treatment or for a different treatment with another catalyst and/or another organoclay and/or different light source and wavelength;
j) repeating step (i) as needed and according to the number of systems in the array of systems; and
k) discharging the treated effluent exiting from the outer chamber 10 of the last system to a suitable system, such as the sewage system or an irrigation system.

In certain embodiments, in the method for treatment of a polluted effluent according to the invention, said auxiliary compounds are selected from oxygen, hydrogen peroxide, acid or base for pH adjustment, and oxidants/reducing compounds.

In certain embodiments, in the method for treatment of a polluted effluent according to the invention, the effluent pollutants are selected from: anionic or cationic dyes, pharmaceuticals, phenols, polyphenols, pesticides, or a combination thereof. Accordingly, in certain embodiments the catalyst in the purification-slurry is selected from: $TiO_2$, $ZnO$, $Fe_2O_3$, $CdS$, $GaP$ and $ZnS$, clay minerals, zeolites, pillared clays, or a combination thereof, and the organoclays are particles prepared by binding of organic aromatic cationic, non-ionic or anionic dyes, e.g. methylene blue, crystal violet, acriflavin, indigo, brilliant red, fast green, fluorescin, etc., with any clay mineral either layer-based, e.g. kaolinite, halloysite, montmorillonite, hectorite, nontronite, or acicular, e.g. sepiolite, palygorskite, or any combination thereof.

In certain embodiments, in the method for treatment of a polluted effluent according to the invention, the concentration of the catalyst(s) and/or organoclay(s) in the outer chamber 10, of each system, is essentially constant throughout the entire chamber.

Certain embodiments of the invention will now be further illustrated by the following non-limiting examples and experiments.

EXAMPLES

1. Preliminary Photodegradation Experiments

The main purpose of the preliminary experiment was to screen a series of pollutants, in order to determine in which cases it is possible to improve considerably photodegradation that might occur anyway, when irradiating pollutants with UVC light (254 nm) combined with a catalyst. All preliminary experiments were performed with organic pollutants, divided to 5 families: (a) anionic dyes, (b) cationic dyes, (c) pharmaceuticals, (d) phenols and polyphenols, (e) pesticides.

Several catalysts were also tested, among them $TiO_2$, raw and Cu exchanged SWy-2 montmorillonite, SHCa-1 hectorite, and Li-synthetic hectorite.

The preliminary experiments were performed as "batch" experiments, in order to observe the influence of different catalysts by irradiating them with UV light (254 nm) during two hours. Initial concentration of each pollutant was prepared in order to obtain a UV-Visible OD of 1.2-1.5, to allow efficient and accurate monitoring of the decrease in concentration of the pollutant. Catalysts were added (when added) at 0.2 g/L. The UV-VIS spectrum after 2 h was measured, and OD at the wavelength of maximum absorption of the pure pollutant was recorded, and the relative reduction from the initial value was evaluated.

Table 1 below concentrates the results:

TABLE 1

| pollutant | catalyst | catalyzed photodegradation | photodegradation without catalyst |
|---|---|---|---|
| Anionic Dyes | | | |
| Acid Yellow | TiO$_2$ | 74% | 67% |
| Fast Green | SHCa-1 | 96% | 70% |
| | TiO$_2$ | 97% | |
| Flourescein | SHCa-1 | 76% | 73% |
| Ponceau Red | SHCa-1 | 45% | 24% |
| Cationic Dyes | | | |
| Rhodamine B | SHCa-1 | 93% | 77% |
| Crystal Violet | TiO$_2$ | 80% | 62% |
| Acriflavine | TiO$_2$ | 98% | 95% |
| Phenols | | | |
| Caffeine | TiO$_2$ | 93% | 19% |
| Picric Acid | TiO$_2$ | 98% | 10% |
| Three-chloro-phenol (TCP) | SHCa-1 | 95% | 50% |
| | Li-hectorite | 94% | |
| | SWy-2 | 93% | |
| | TiO$_2$ | 96% | |
| Pharmaceuticals | | | |
| Acetaminophen | TiO$_2$ | 99% | 42% |
| Chloramphenicol | TiO$_2$ | 72% | 48% |
| Tetracycline | Cu SWy-2 | 94% | 70% |
| Pesticides | | | |
| Methyl Viologen ("Paraquat" ®) | TiO$_2$ | 93% | 42% |
| Ethoxyquin ("Decco-Scald") | TiO$_2$ | 90% | 83% |

Based on the preliminary experiments and in order to focus on the efficiency of the device, the following considerations were taken for the continuation of the experiments:
(1) Since TiO$_2$ exhibited better overall performance, most of the experiments with the device were done with DeGussa 25 TiO$_2$. Preparation of pillared clays with Ti atoms in the lattice was also tested.
(2) In the $2^{nd}$ set of experiment concentrations was monitored by kinetic measurements in a flowing cuvette in a diode array UV-VIS spectrophotometer. Kinetic analysis for fitness to $0^{th}$, $1^{st}$ or $2^{nd}$ order (see detailed theoretical explanation below) was performed on several wavelengths of the spectra. Experiments were performed for selected chemical belonging to "dyes", "phenols", and "pharmaceutical" groups. No additional experiments with pesticides were performed, due to problematic analytical issues caused by formulation additives to the commercial pesticides.
(3) The $3^{rd}$ set of experiments included a few pollutants, and simultaneously to UV-VIS measurements, additional measurements by other techniques were performed (TOC, LCMS) in order to ensure that indeed full demineralization (decrease in the amount of ORGANIC carbon) was achieved. A seek for partial degradation compounds will be performed by QTOF measurements.
(4) The $4^{th}$ set of experiments monitored complete degradation of relatively low concentrations (1 ppm) of priority pollutants in one pass through the device (retention time of <2 h). These measurements were performed by LCMS with a LOD of 0.001 ppm. After 2.5 h the lamp was shut off to monitor the increase in the concentration of the pollutant due to lack of photocatalysis.

The order of the process is defined by fitness to the equation:

$$v = \frac{d[C]}{dt} = k[C]^a$$

Where v is the reaction rate (the rate in which the concentration C of the pollutant changes with time), k is the kinetics constant, and a is the order of the process—that is empirically found, and is related to the mechanism in which the process occurs (White, 2003).

To simplify the calculations, avoid units mismatch, and allow comparison between parameters in different reaction mechanisms, A, the "relative concentration at time t" is defined as $C_t/C_0$ (the ratio between the actual to the initial concentration). According to that, it is obvious that $A_0=1$.

A $0^{th}$ order process is one in which $$\frac{d[A]}{dt} = -k[A]^0 = -k.$$

Thus, in a $0^{th}$ order process the reaction rate is not a function of the reactant concentration.

Integration of this equation leads to $[A]=[A]_0-kt=1-kt$. Thus, a linear representation of $[A]$ as a function of the time will yield the fit to a $0^{th}$ order process, and the slope will be the kinetic coefficient. Half time life can be calculated as $$t_{1/2} = \frac{1}{2k}.$$

It should be mentioned that without transforming it to relative concentration, $t_{1/2}$ would depend on the initial concentration.

A $1^{st}$ order reaction means that the reaction proceeds at a rate that depends linearly on the concentration of the reactant (this means that the rate at which a reactant is consumed is proportional to its concentration at that time). A $1^{st}$ order process is one in which $$\frac{d[A]}{dt} = -k[A]^1 = -k[A].$$

Integration of this equation leads to $$[A] = \frac{[C]}{[C]_0} = e^{-kt},$$

which can be linearized to $\ln[A]=-kt$ Thus, a linear representation of the logarithm of $[A]$ as a function of the time will yield the fit to a $1^{st}$ order process, and the slope will be the kinetic coefficient. Half time life can be calculated as $$t_{1/2} = \frac{-\ln\left(\frac{1}{2}\right)}{k} = \frac{\ln 2}{k},$$

and is independent from the initial concentration, even without transformation to relative concentration (Rytwo, G. and Gonen, Y., 2009).

A $2^{nd}$ order process is one in which $$\frac{d[A]}{dt} = -k[A]^2.$$

Integration of this equation leads to directly $$\frac{1}{[A]} = kt + 1.$$

Thus, a linear representation of the reciprocal of [A] as a function of the time will yield the fit to a $1^{st}$ order process, and the slope will be the kinetic coefficient. Half time life can be calculated as $$t_{1/2} = \frac{1}{k}.$$

As in the $0^{th}$ order case, without transforming it to relative concentration, $t_{1/2}$ would depend on the initial concentration.

Equations presented hereby are generally referred as "pseudo-order equations", since they consider only the concentration of one component (in this case, the pollutant). This assumption is logical when either the other components don't influence the process, or their concentration is so large that no measurable changes can be observed. In the present case, the products don't influence the photodegradation process.

2. Photodegradation of Dye Fast Green in the Presence of $TiO_2$

Figure 3A:
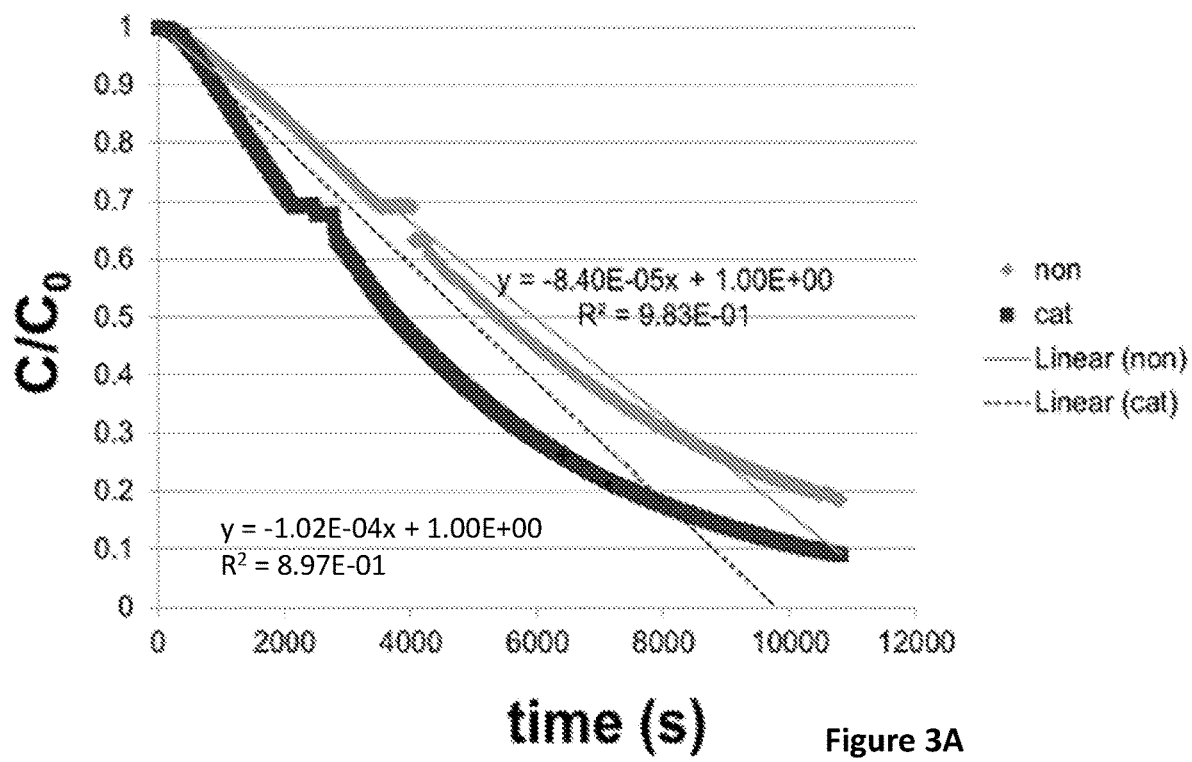
FIGS. 3A-C are graphs showing results of a photodegradation reaction of dye fast green as a function of time, while applying UV light in the presence or absence of the catalyst TiO₂ ("cat" or "non", respectively). The dotted lines represent linear regression for each curve: (A) is a $0^{th}$ order reaction; (B) is a $1^{st}$ order reaction; and (C) is a $2^{nd}$ order reaction.
Figure 3B:
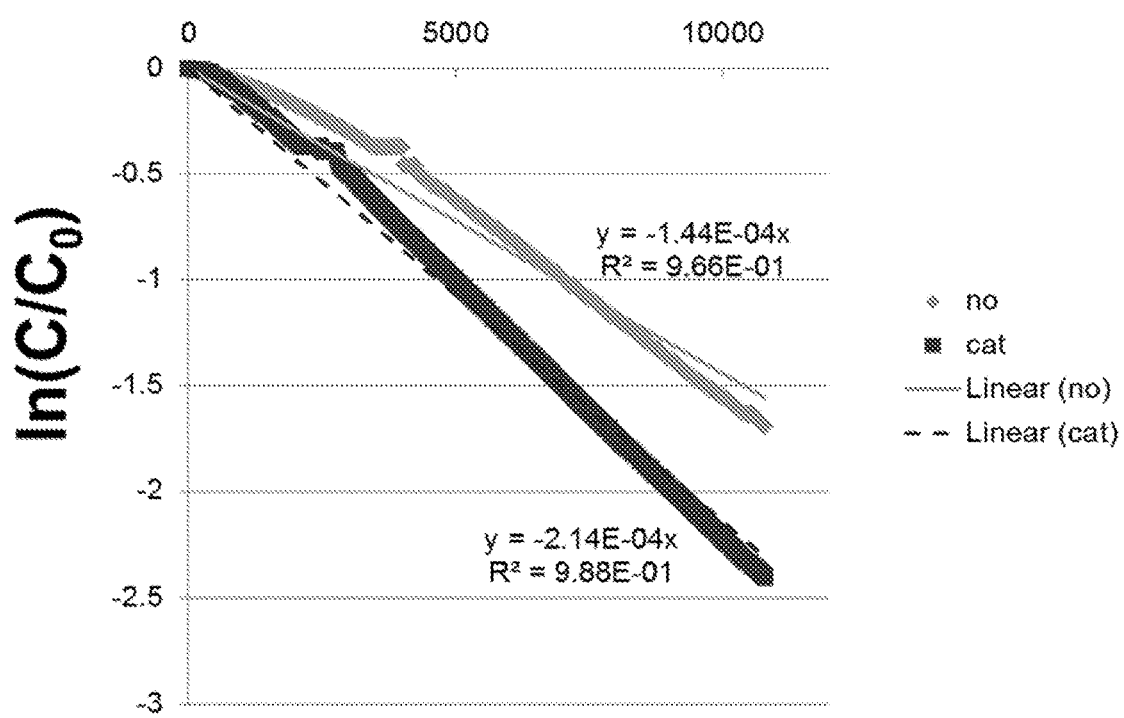
Figure 3C:
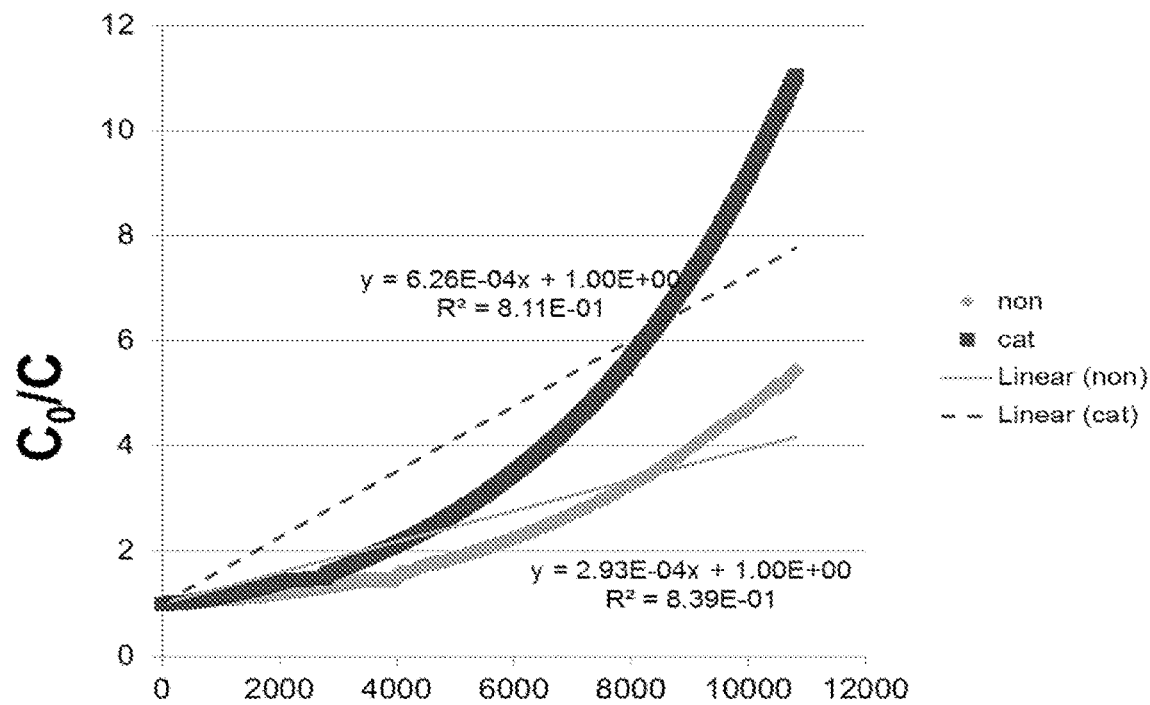

FIG. 3 shows concentration of the dye fast green as a function of time, when UV light is applied without catalyst ("non") or with $TiO_2$ ("cat"). Linear regressions are shown also in the figure. The concentration of the dye was monitored in a flowing cuvette in a diode array UV-visible spectrophotometer. It can be seen that there is substantial photodegradation of the dye without catalyst, however the $TiO_2$ increases the rate of degradation. FIG. 3A-C presents the fit to a $0^{th}$, $1^{st}$ and $2^{nd}$ order kinetics, respectively.

FIGS. 3A and 3C show that there is no good fit for the $0^{th}$ and $2^{nd}$ order process, with the linear line, which might mean that both catalyzed and non-catalyzed processes follow a pseudo $1^{st}$ order path. FIG. 3B shows that there is a very good fit for both catalyzed and uncatalyzed reactions (thus with and without the catalyst $TiO_2$) when fitted to a $1^{st}$ order reaction. However, $TiO_2$ markedly increases the reaction rate (evident by the slope of the lines) by almost 50% ($2.14 \times 10^{-4}$ s$^{-1}$ compared to $1.44 \times 10^{-4}$ s$^{-1}$). The half-live time of the reactant can be evaluated accordingly to be about 4170 and 2960 sec. for the non-catalyzed and the catalyzed processes, respectively.

Thus, fast green photodegradation is a $1^{st}$ order process, that is considerably accelerated by the catalyzed reaction in the system of the invention.

Similar experiments were conducted for the phenolic pollutant picric acid (FIGS. 4A-C) and for acetaminophen (paracetamol) (FIGS. 5A-C) in the presence or absence of the catalyst $TiO_2$ ("cat" or "non", respectively).

Figure 4A:
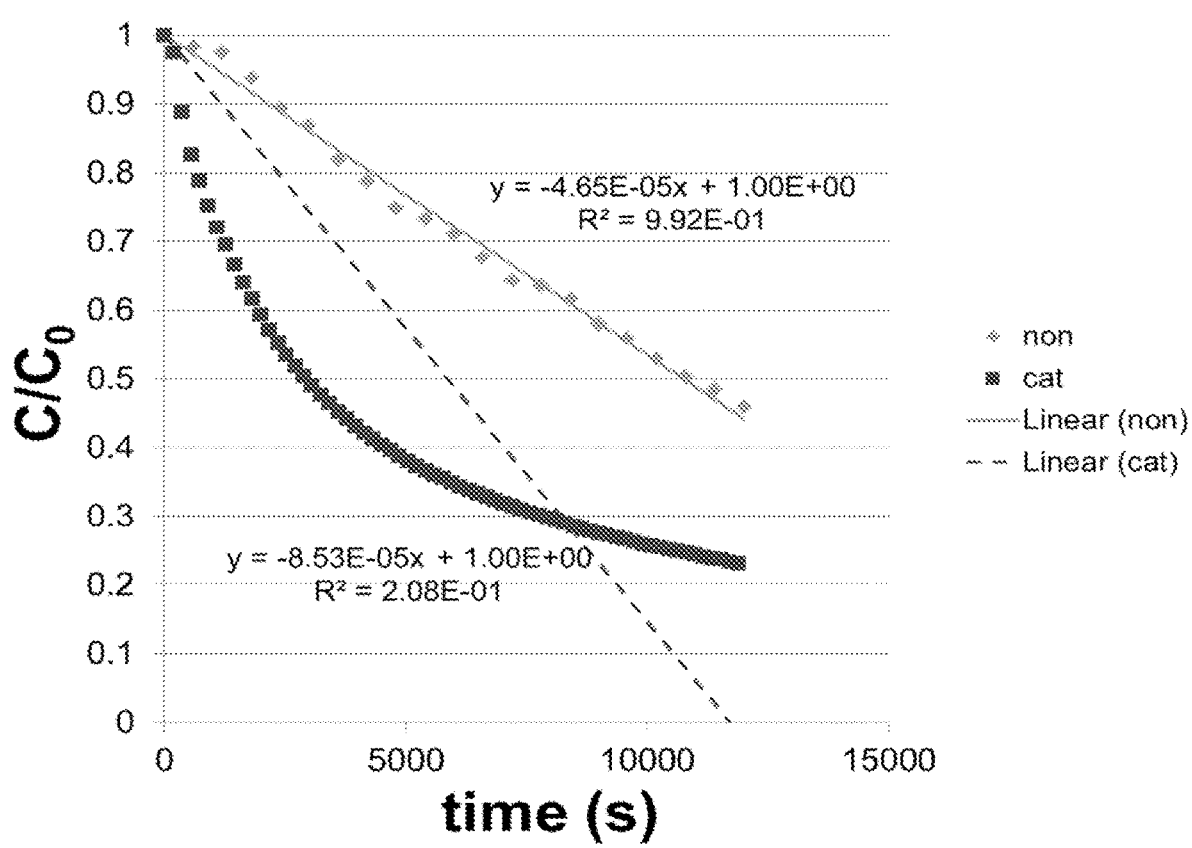
FIGS. 4A-C are graphs showing results of photodegradation reaction of picric acid as a function of time, while applying UV light in the presence or absence of the catalyst TiO₂ ("cat" or "non", respectively). The dotted lines represent the linear regression for each curve: (A) is a $0^{th}$ order reaction; (B) is a $1^{st}$ order reaction; and (C) is a $2^{nd}$ order reaction.
Figure 4B:
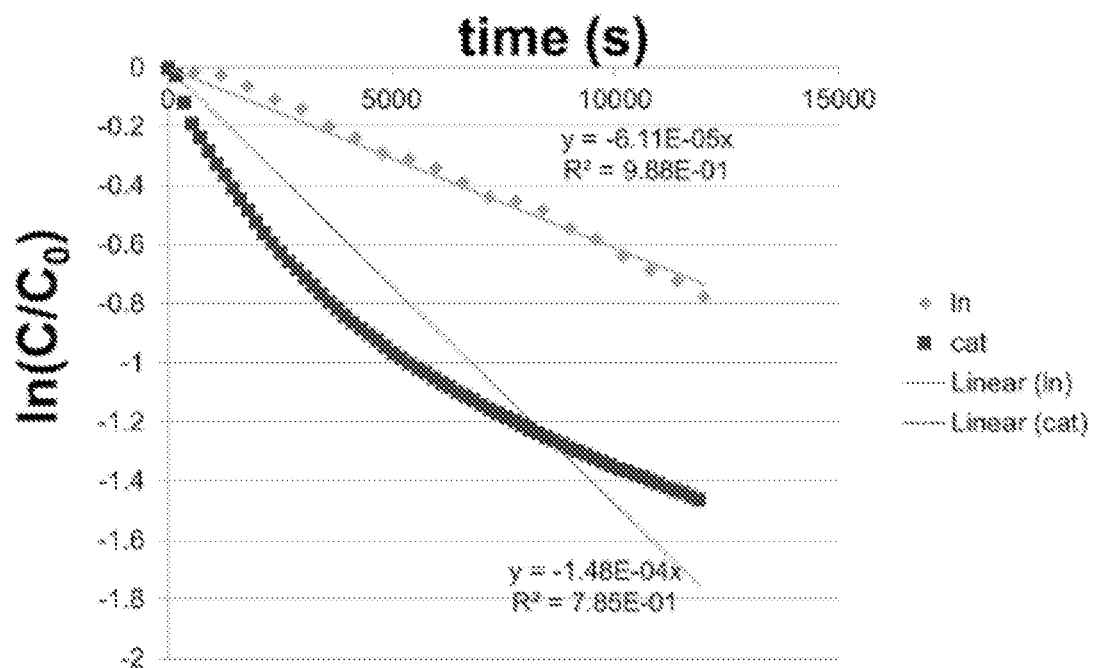
Figure 4C:
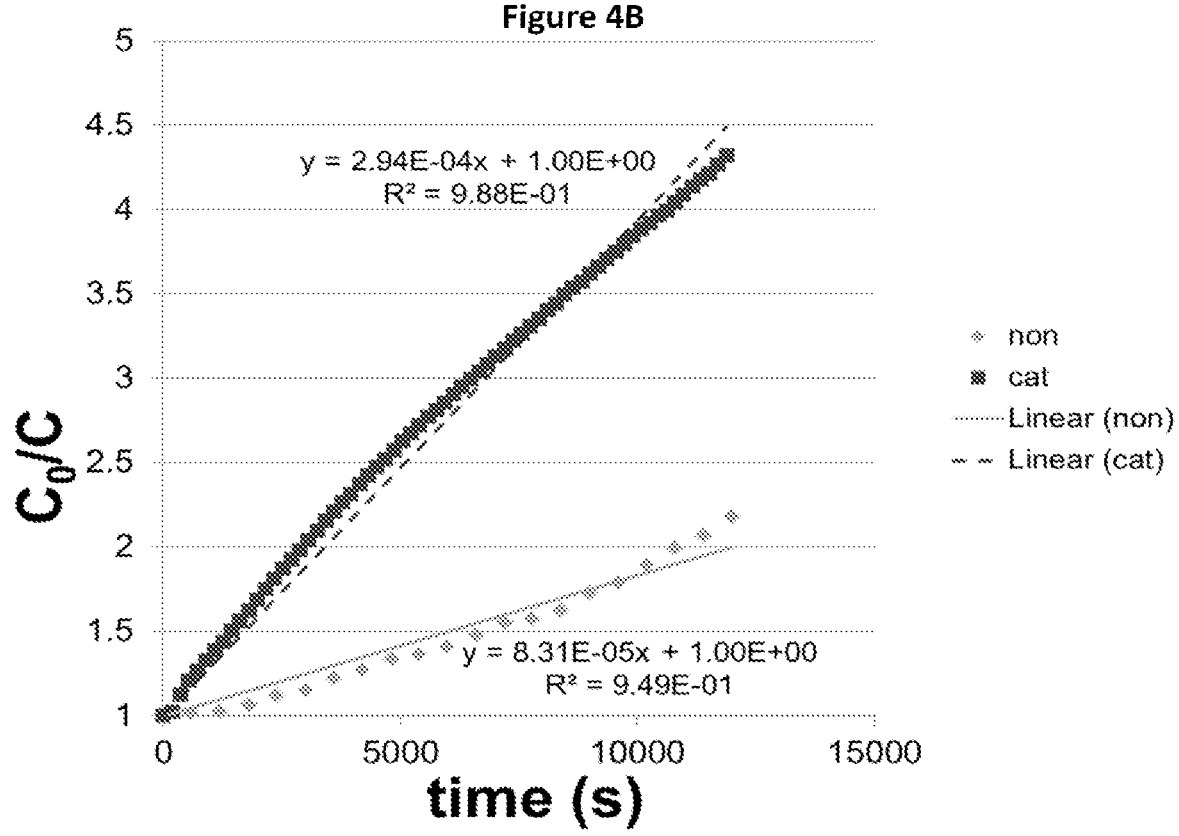

FIG. 4A shows that non-catalyzed picric acid degrades with UV radiation following a $0^{th}$ order pathway. However, as evident from FIGS. 4A and 4B, the addition of $TiO_2$ yields results that cannot be adapted to neither a $0^{th}$ nor a $1^{st}$ order reaction. On the other hand, FIG. 4C shows that the fit of the catalyzed photodegradation to a $2^{nd}$ order reaction is very good. The half-live time of picric acid is evaluated according to the suitable order for each reaction to be about 10700 and 3670 sec. for the non-catalyzed and catalyzed processes, respectively. Thus, in these cases the process is not only accelerated by the system of the invention, but the mechanism of the reaction also changes considerably—from not being at all influenced by the pollutant concentration, to being influenced by it to the second power—thus, increasing the initial concentration by two folds might increase the photodegradation rate four times.

Figure 5A:
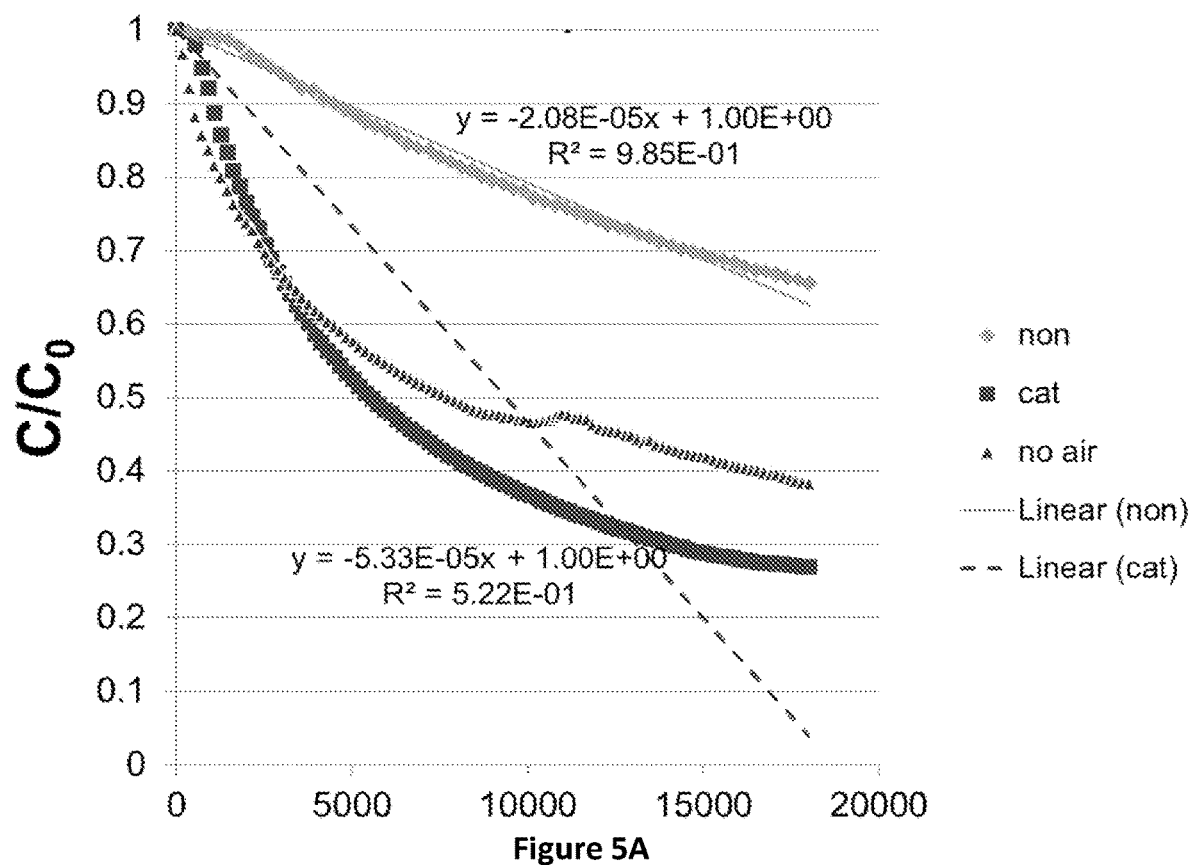
FIGS. 5A-C are graphs showing results of photodegradation reaction of acetaminophen (paracetamol): squares-lines represent the reaction in the presence of the catalyst (TiO₂) when air is bubbled to the liquid ("cat"); triangles-lines represent the reaction without the addition of air ("no-air"); and diamonds-lines represent the reaction without the catalyst ("non"). (A) is a $0^{th}$ order reaction; (B) is a $1^{st}$ order reaction; and (C) is a $2^{nd}$ order reaction.

FIGS. 5A ($0^{th}$ order), 5B ($1^{st}$ order) and 5C ($2^{nd}$ order) show degradation of acetaminophen (paracetamol) with or without the catalyst $TiO_2$ ("cat" or "non", respectively), and with a catalyst but without the addition of air ("no air"). As shown, after approximately 12000 sec. the reaction changes course. Dissolved oxygen measurements show that these course changes are due to the lack of oxygen needed for the catalysis reaction. The squares-lines represent a reaction with the catalyst while bubbling air into the liquid to replenish the oxygen and avoid anoxic conditions.

Figure 5B:
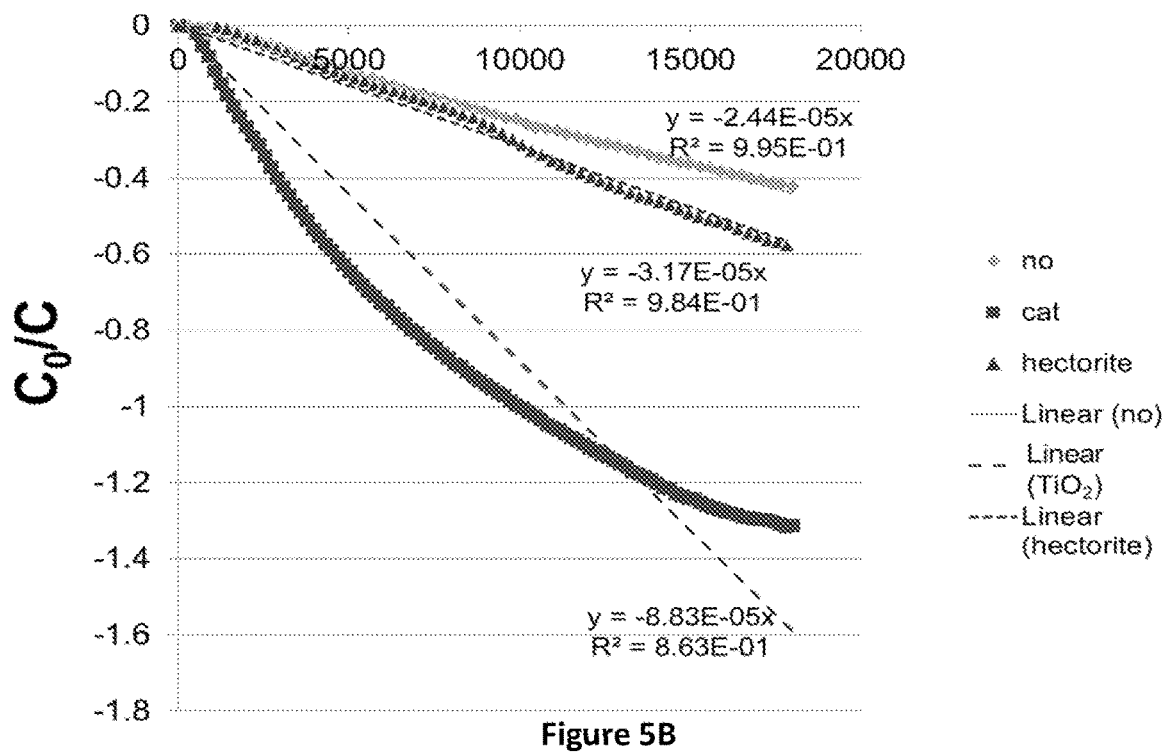
Figure 5C:
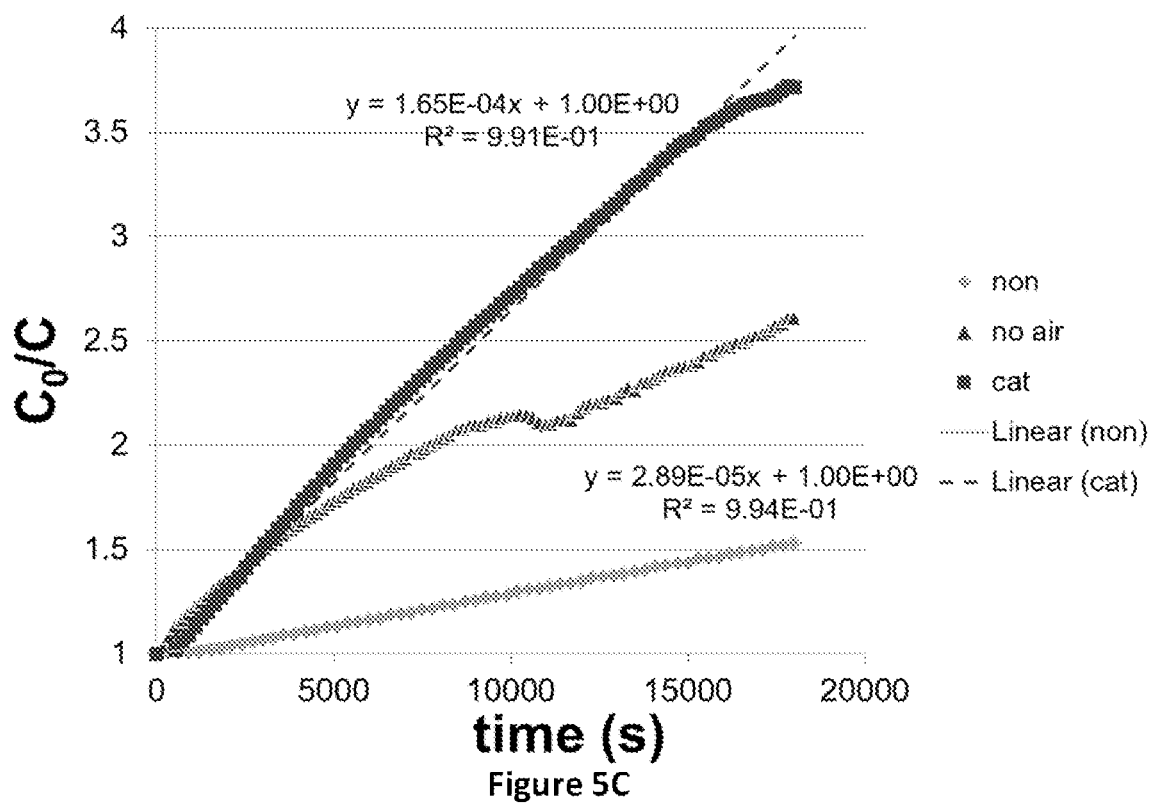

Similarly to picric acid photodegradation, acetaminophen degradation (without a catalyst) with UV radiation fits quit well to a $0^{th}$ order process (FIG. 5A), but a better fit can be seen for the $1^{st}$ order reaction (FIG. 5B) with a half-life time of about 28,000 sec. As seen in FIGS. 5A and 5B, addition of $TiO_2$ yields results that cannot be adapted to neither a $0^{th}$ nor a $1^{st}$ order reaction. On the other hand, FIG. 5C shows that the fit of the catalyzed photodegradation to a $2^{nd}$ order reaction is very good, with an acetaminophen half-life time of about 6,280 sec.

Interestingly, as seen in FIG. 5B, when the reactions were performed without adding air into the liquid, after approximately 12,000 sec. a process that fits a $1^{st}$ order reaction is observed, with an evaluated half-life time of about 23,500 sec. Thus, under anoxic conditions the catalytic process is less effective, and the mechanism transforms from being dependent on the squared pollutant concentration, to being dependent on the concentration itself. This is a clear indication that the catalytic reaction changes due to the lack of oxygen. The similar slope to the non-catalyzed photodegradation might indicate that lack of oxygen hinders catalysis, but the non-catalyzed reaction continues.

Figure 6:
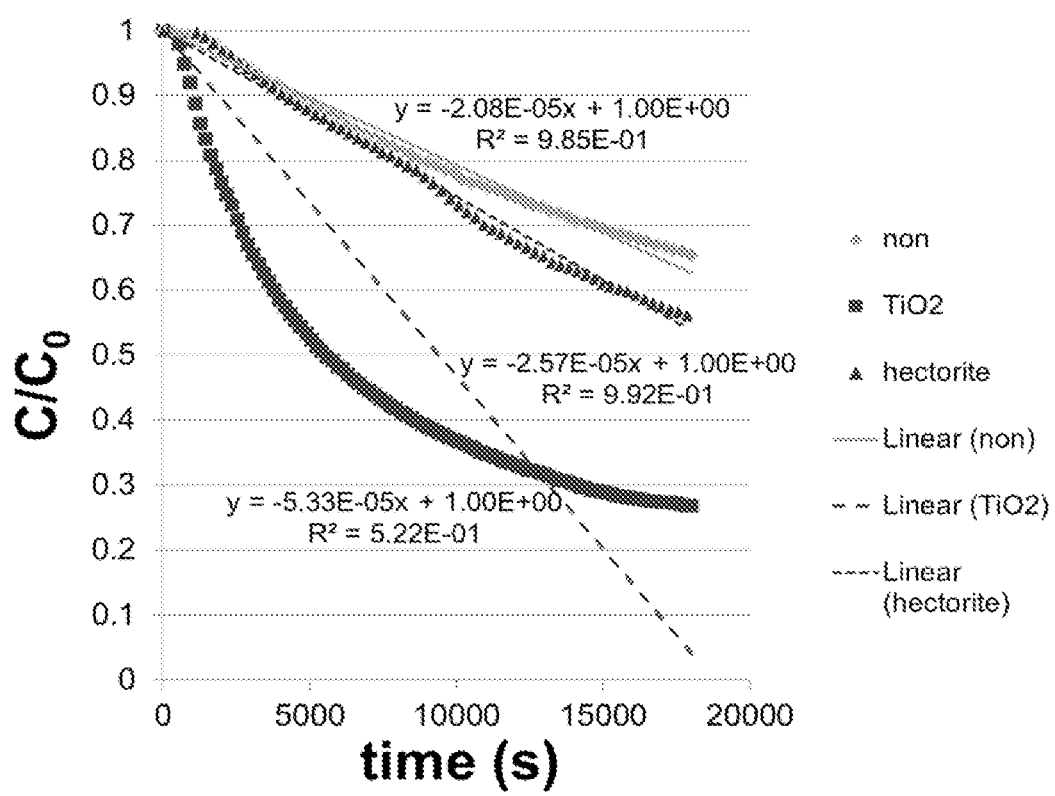
FIG. 6 is a graph showing results of acetaminophen photodegradation reaction without a catalyst ("non") or in the presence of the catalyst TiO₂ ("cat") or the catalyst hectorite ("hectorite"). The dotted lines represent the linear regression for each curve fitted to a $0^{th}$ order reaction.

FIG. 6 compares the degradation of acetaminophen in the presence of either hectorite or $TiO_2$. As clearly seen in FIG. 6, hectorite slightly changes the non-catalyst degradation path, decreasing the half-life time of acetaminophen from 28,000 to 18,500 sec., while the reaction remains pseudo $0^{th}$ order. The use of $TiO_2$ as a catalyst dramatically changes the kinetics to a $2^{nd}$ order process, lowering the half-life time of the pollutant (as mentioned above) to less than 6,300 sec.

Figure 7A:
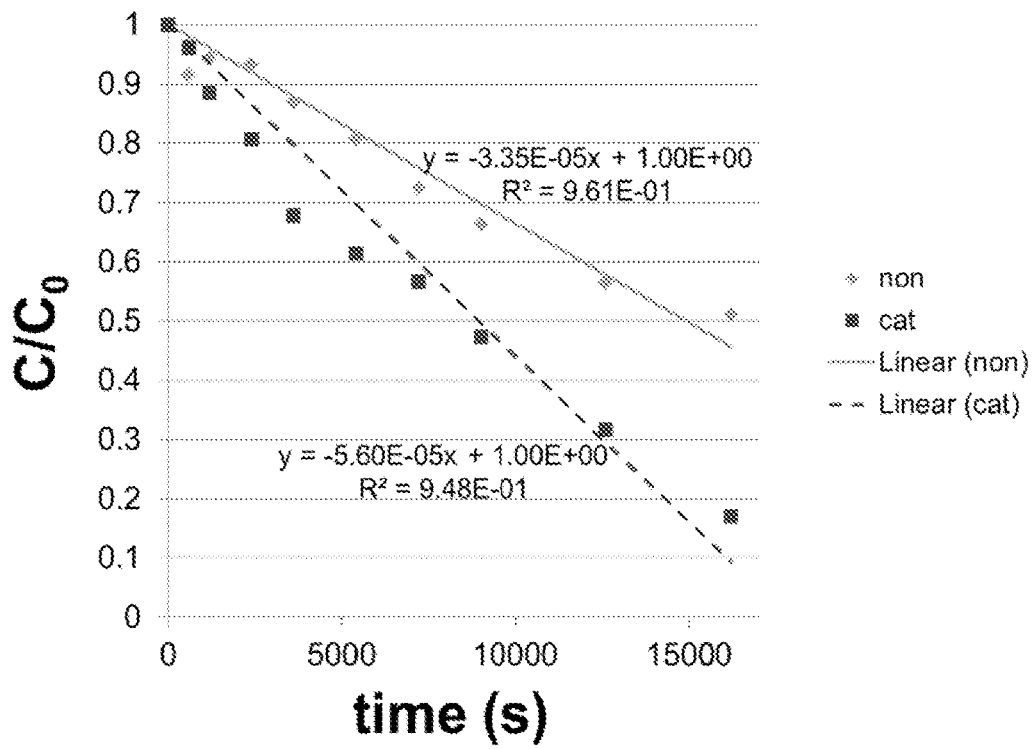
FIGS. 7A-C are graphs showing results of photodegradation reaction of chloramphenicol as a function of time, while applying UV light in the presence or absence of the catalyst TiO₂ ("cat" or "non", respectively). The dotted lines represent the linear regression for each curve: (A) is a $0^{th}$ order reaction; (B) is a $1^{st}$ order reaction; and (C) is a $2^{nd}$ order reaction.
Figure 7B:
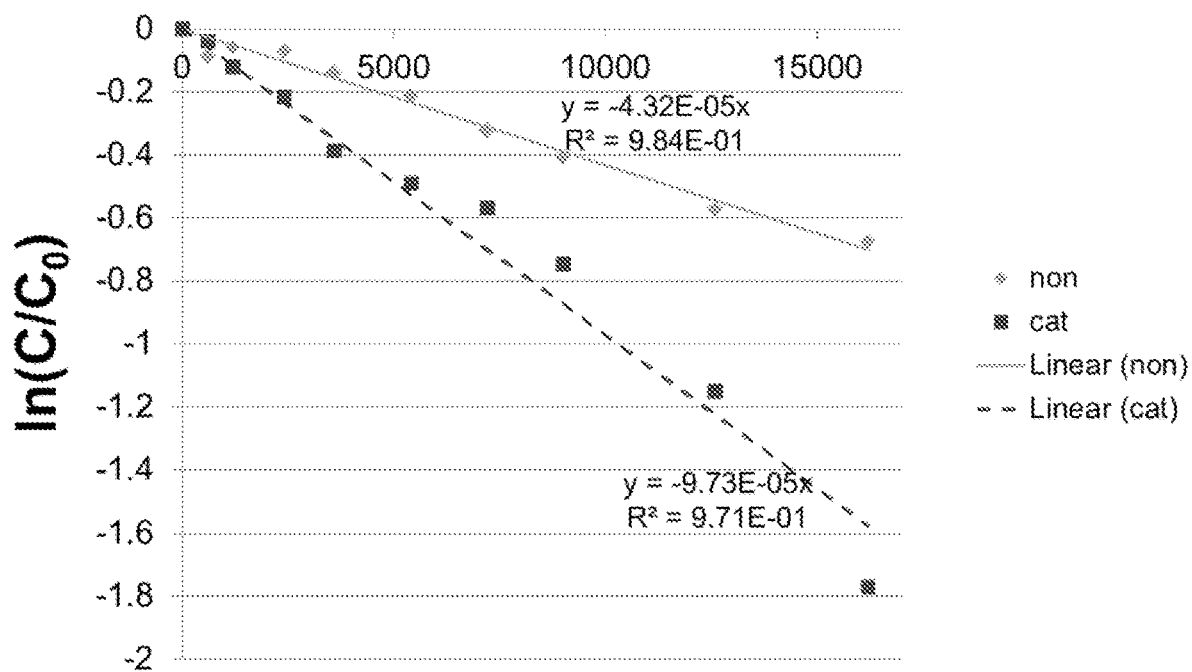
Figure 7C:
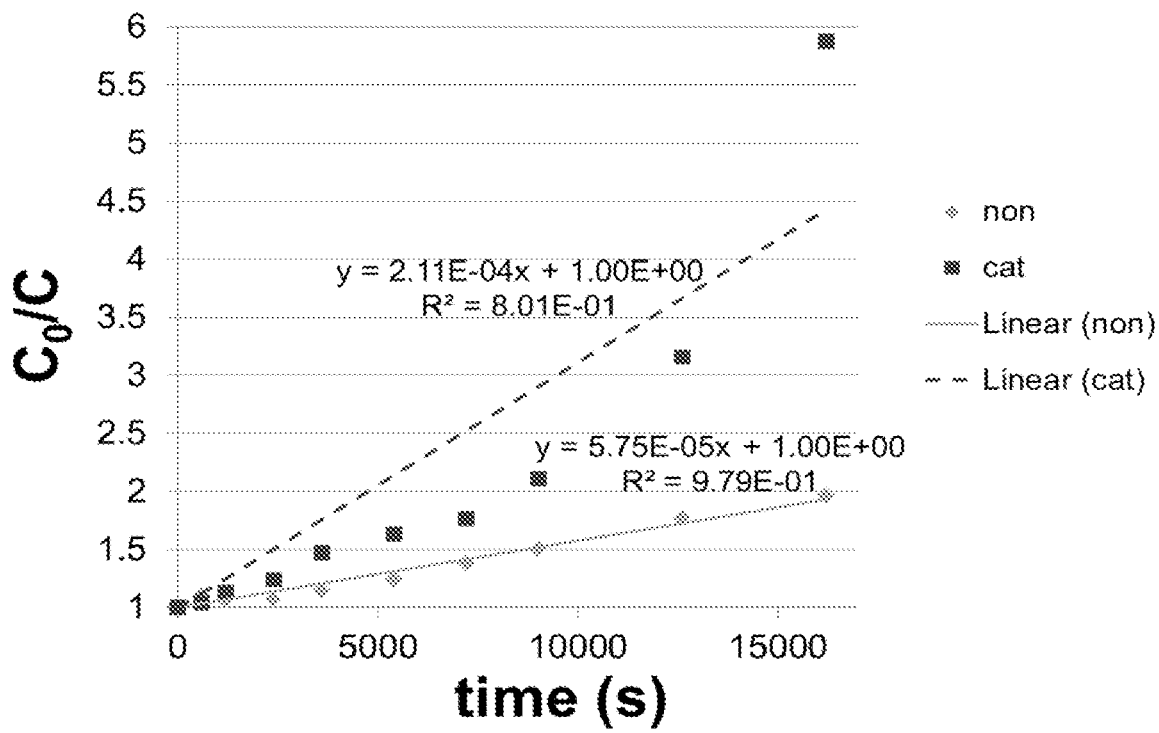

FIGS. 7A-C ($0^{th}$ order, $1^{st}$ order and $2^{nd}$ order, respectively) show photodegradation of the antibiotic chloramphenicol with or without the catalyst $TiO_2$ ("cat" or "non", respectively) Non-catalyzed results fit quite well to a $0^{th}$ order reaction with a half-life time of about 15800 sec. Good fit can be also been seen for the $1^{st}$ and even for the $2^{nd}$ order processes (FIGS. 7B and 7C). Thus, $0^{th}$ order fit should be preferred for the non-catalyzed process.

On the other hand, catalyzed degradation fits better a $1^{st}$ order reaction (FIG. 7B), with a half-life time of about 6870 sec. Results for chloramphenicol do not seem to fit well to a $0^{th}$ or a $2^{nd}$ order reaction (FIGS. 7A and 7C).

3. Measuring Pollutant Mineralization During Photodegradation in the Presence of $TiO_2$ In order to confirm that the above UV-visible measurements provide appropriate indication of pollutant concentration, and in order to demonstrate that complete mineralization can be achieved, effluents were sampled during the photodegradation reactions, and measured by liquid chromatography-mass spectrometry (LCMS) for pollutant concentration, and by total organic carbon measurements (TOC) for mineralization analysis.

Figure 8:
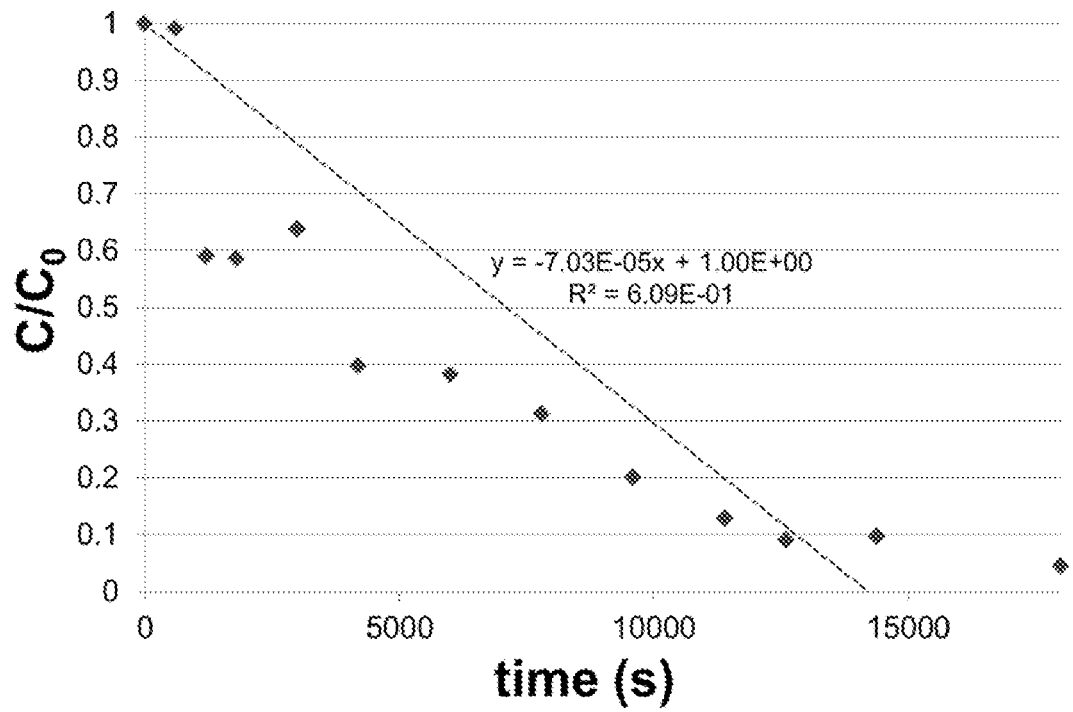
FIG. 8 is a graph showing results of liquid chromatography-mass spectrometry (LCMS) measurement of an acetaminophen photodegradation reaction in the presence of the catalyst TiO₂ with air being bubbled into the liquid. The straight line represents the linear regression fitted to a $0^{th}$ order reaction.

FIG. 8 shows LCMS measurements of the photodegradation of acetaminophen catalyzed by $TiO_2$. The measurements clearly confirm the UV-visible measurements shown in FIGS. 5A-C and 6. Acetaminophen half-life time in this case (as evaluated by a $1^{st}$ order linearization) is 4,130 sec, slightly lower compared to the 6,300 sec. that was calculated in the UV-visible experiment. The difference might be ascribed to different experiment conditions, but nevertheless the values are very close and are of the same order of magnitude.

Figure 9:
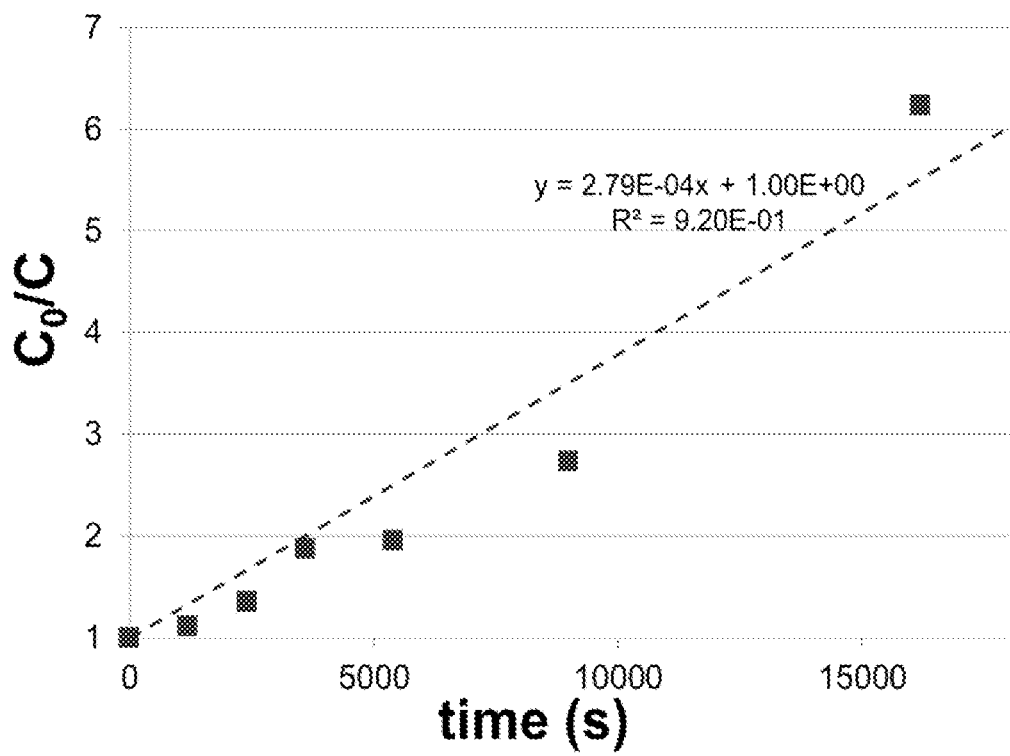
FIG. 9 is a graph showing results of LCMS measurement of picric acid photodegradation reaction in the presence of the catalyst TiO₂ with air being bubbled into the liquid. The straight line represents the linear regression fitted to a $2^{nd}$ order reaction.

FIG. 9 shows LCMS measurements of picric acid photodegradation in the presence of the catalyst $TiO_2$ adapted to a $2^{nd}$ order reaction: after 7 h (c.a. 25,000, results not shown in the figure), less than 2% of the added picric acid (0.4 mM) remained. These results confirm the UV-visible data presented in FIGS. 4A-C. Interestingly, for picric acid the fit between the two measurement methods is even more significant than for acetaminophen, presenting a half-life time of 3,160 sec., compared to the 3700 sec. calculated in the UV-visible measurement. Considering the complexity of the experiment and the conditions, these values, measured separately for completely non-related experiments and by completely different analytical methods, might be considered identical.

One of the most important issues to be demonstrated in a photocatalytic degradation device, is that total mineralization is achieved. In order to test that, total organic carbon (TOC) measurements were performed. Due to the limitation of the measurement instrument, the limit of detection (LOD) at the experimental conditions was 5 ppm.

Figure 10:
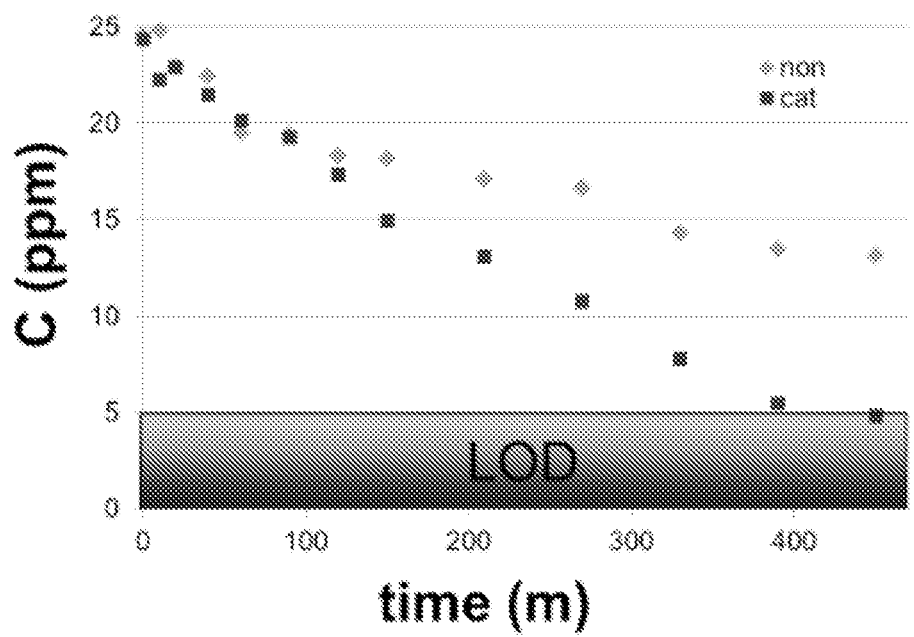
FIG. 10 is a graph showing results of a total organic carbon (TOC) measurement of chloramphenicol photodegradation reaction in the presence or absence of the catalyst TiO₂ ("cat" or "non", respectively). LOD means Limit of Detection.

FIG. 10 shows TOC measurements of the photodegradation of chloramphenicol from an initial concentration of 25 ppm with or without the catalyst $TiO_2$ ("cat" or "non", respectively). It can be seen that while both catalyzed and non-catalyzed values decrease constantly, when catalyzed, the concentration of chloramphenicol after 450 min. goes below the LOD of the measuring instrument. Similar results were obtained for TOC measurements of picric acid photodegradation (not shown). As for acetaminophen, TOC measurements indicate only a 60% mineralization (not shown). Similar experiments performed in previous studies also showed problems achieving full mineralization of acetaminophen as measured by TOC, even when obtaining full degradation of 50 ppm acetaminophen (Moctezuma et al., 2012). The researchers ascribe to the formation of low molecular weight carboxylic acids.

4. Photodegradation of Low Pollutant Concentration

In all the previous experiments the initial pollutant concentrations were relatively high in order to allow easy and accurate on-line monitoring by UV-visible spectroscopy. However, this is a relatively not sensitive measurement technique for such pollutants. The $4^{th}$ set of experiments can be considered the most important, since it was performed with closer to real concentration, and measurements were performed by very high sensitivity LCMS (LOD of 0.001 ppm).

Large volumes of 2 ppm pollutant were prepared ("effluent"), and pumped into the outer chamber of the system of the invention together with 0.1 g/L $TiO_2$. The feeding pump and the lamp were switched on at the same time. After 2.5 h (150 m) the lamp was turned off, but the pump continued working in order to monitor the increase in the concentration of the pollutant due to lack of photocatalysis. According to the experimental conditions the expected results are:

at t=0 the initial concentration should be measured, since the effluents did not undergo any photocatalysis. Concentration is expected to decrease as the effluent has longer contact time with the light and the catalyst;

after some time, if the device works appropriately, concentration should decrease to zero;

after about 150 min., when the lamp is turned off, the pollutant's concentration should start to increase until it eventually returns to its initial value (2 ppm).

Figure 11A:
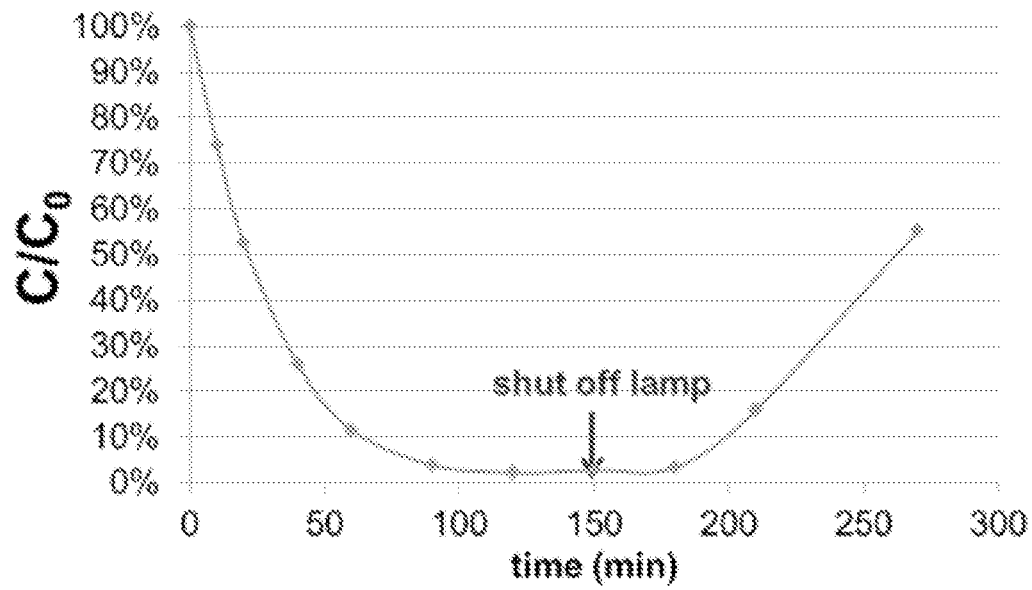
FIGS. 11A-C are graphs showing the relative concentration of acetaminophen (A), picric acid (B), and chloramphenicol (C), in the treated effluent over time.
Figure 11B:
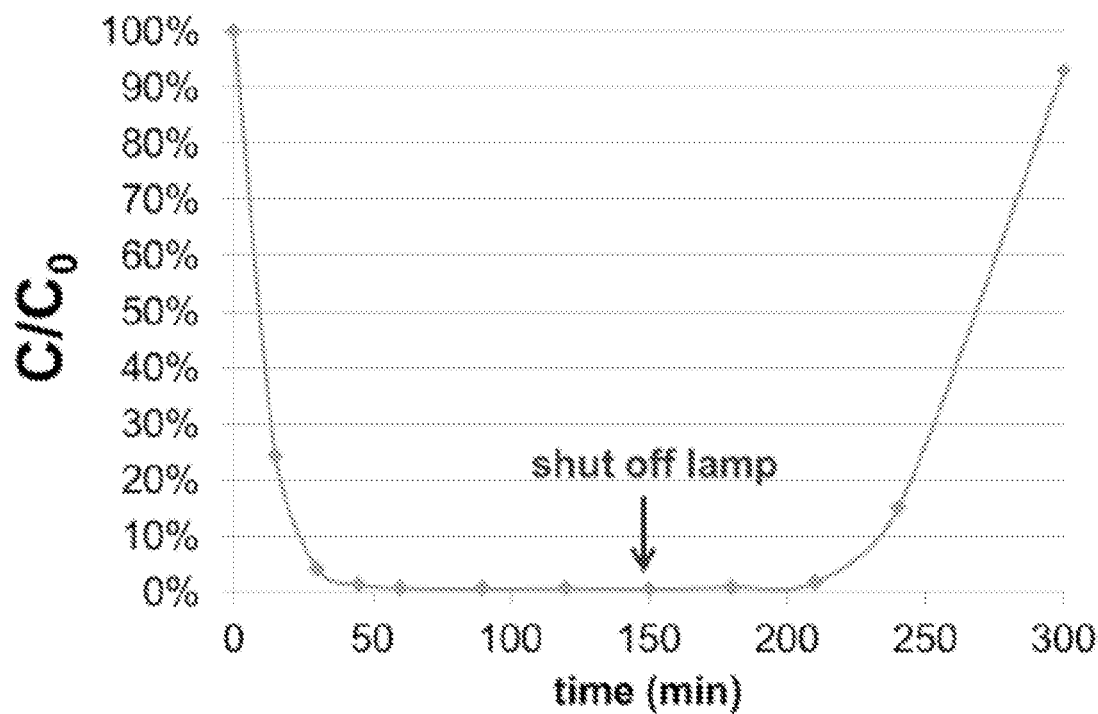
Figure 11C:
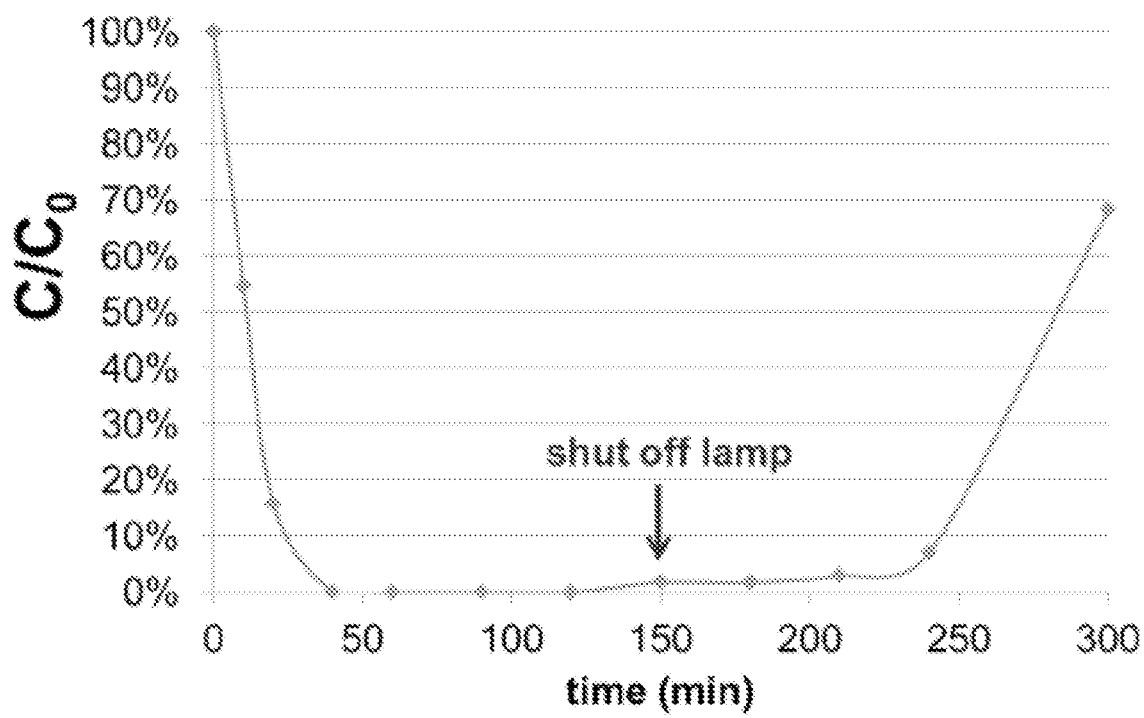

As can be seen in FIGS. 11A-C, the behavior for all tested pollutants is as expected. At the tested pollutant concentration (2 ppm) and the flow rate (20 ml/min) applied in the experiments, full degradation of acetaminophen (FIG. 11A), picric acid (FIG. 11B) and chloramphenicol (FIG. 11C) is achieved after 90, 30 and 40 min., respectively.

In summary, the results presented hereby clearly demonstrate the ability of the system of the invention to photocatalyze the polluted effluent to full mineralization of priority pollutants while the effluvent flows through the system.

5. Organoclay as a Fast Sorbent for Organic Pollutants 5.1 Wyoming Montmorillonite Removes CV and EB Materials and Methods Wyoming montmorillonite (SWy-2) was purchased from the Source Clays Repository of The Clay Minerals Society (Columbia, Mo., USA). Cation Exchange Capacity (CEC) of the clay was reported to be 0.8 mol $kg^{-1}$, with $Ca^{2+}$ and $Na^+$ as main exchangeable cations. Crystal violet (CV) was obtained from Fluka Chemica (Fluka Chemie AG, Buchs, Switzerland). Erythrosine-B (EB) was purchased from Spectrum (Gardena, Calif., USA). 2,4,5-trichlorophenol (TCP) was obtained from Aldrich (Germany). High-quality C4386 activated carbon was obtained from Sigma (Germany). All materials were used without further treatment or purification.

An organoclay with CV up to 100% of the CEC (denoted as M100) was prepared by adding 1 g dry clay to 200 ml of distilled water, and stirring it for several minutes, until homogenous suspension was observed. CV powder was added slowly, and stirring continued for 2 h. The amount of CV adsorbed was calculated by sampling and filtering the suspension and measuring the remaining dye in the supernatant by UV-visible spectroscopy using an HP 8452A diode array spectrophotometer, at 588 nm. Almost no dye remained in solution, indicating complete adsorption (0.8 mol CV per kilogram crude clay).

Adsorption experiments of EB on M100 or AC suspensions were performed by preparing a 1-mM EB stock solution and adding the desired volume of EB solution to the sorbent suspension, bringing the final volume to 100 ml. Measurements of the dye concentration as a function of time were performed by two different and independent methods:

(a) Filtering: The experiment was prepared in 100 ml batch vessels at constant stirring. At each time step, 5 ml was sampled and filtered using a 0.45 µm syringe filter (Minisart, Sartorius AG. Gottingen, Germany). Previous experiments showed that the filters do not adsorb EB or TCP. EB concentration was calculated by measuring optical density of the remaining dye in the filtrated solution at 526 nm, using a UV-visible HP 8452A spectrophotometer.

Figure 13:
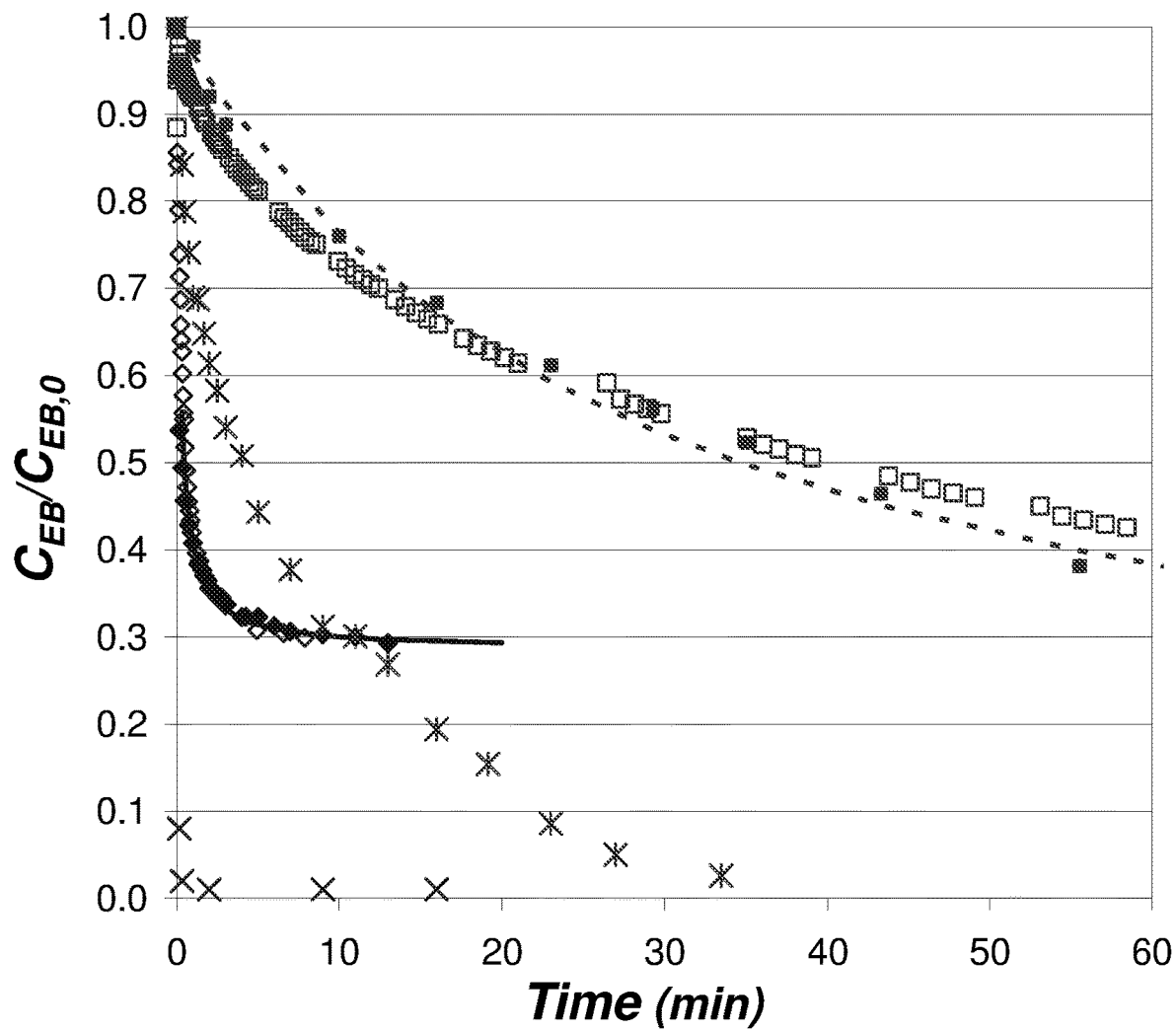
FIG. 13 is a graph showing the ratio of concentration of EB ($C_{EB}$) to its initial concentration ($C_{EB,0}$) as a function of time. Initial sorbent concentration is 0.02 g l$^{-1}$ and $C_{EB,0}$=1 µM: ■—AC filtered; □—AC in situ; dashed line—AC calculated; ◆—M100 filtered; ◇—M100 in situ; full line—M100 calculated. The following indicate initial sorbent concentration of 1 g l$^{-1}$, and $C_{EB,0}$=100 µM: *—AC filtered, X—M100 filtered.

(b) In situ measurement: The experiment was performed in situ using a 5-cm length cuvette placed directly on the HP 8452A spectrophotometer stand. This allows very fast measurements, but can be performed only at low sorbent concentrations. The whole spectrum was measured (190-820 nm) and was mathematically deconvoluted to the spectra of the dye, the adsorbed dye, and the sorbent, using a spectra-subtraction computer program prepared using MATLAB. As seen in FIG. 13, both techniques yielded similar results.

Adsorption experiments of TCP were performed using the filtering method, and the pollutant concentration was measured at 244 nm using a HP 8452A spectrophotometer.

Results

FIG. 13 shows changes of the ratio between measured EB concentration as a function of time ($C_{EB}$) and its initial concentration ($C_{EB,0}$). At sorbent amounts of 0.02 g l$^{-1}$ and $C_{EB,0}$=1 μM (0.880 mg EB per liter), equilibrium is reached in less than 10 min for M100, while for AC equilibrium, time was at least 80 min. In both cases, the equilibrium concentration is similar (about 30% $C_{EB,0}$), indicating similar capacities of sorption for both sorbents at those conditions. To quantitatively compare the results with previously published studies, the adsorbed amounts as evaluated from the remaining dye in solution using method (a) above were adapted to a pseudo second-order model, using the equation:

$$\frac{t}{q_t} = \frac{1}{kq_e^2} + \frac{1}{q_e}t$$

where t is the time (in minutes), $q_e$ is the equilibrium amount sorbed (gram per kilogram), and k is the rate of sorption (kilogram per gram per minute). The calculated values for $q_e$ for both sorbents were relatively similar: 62.8 and 78.7 g kg$^{-1}$ for M100 and AC, respectively. However, the rates of sorption (k) differed by more than two orders of magnitude, yielding 7.76×10$^{-2}$ kg g$^{-1}$ min$^{-1}$ for M100 and 4.45×10$^{-4}$ kg g$^{-1}$ min$^{-1}$ for AC. As seen in FIG. 13, method (b) (in situ direct measurement) yielded similar results.

To compare with previously reported values, experiments at sorbent amounts of 1 g l$^{-1}$ and $C_{EB,0}$=100 μM (88 mg l$^{-1}$) were performed. When compared with the 0.02 g l$^{-1}$ experiments, sorption kinetics was considerably faster for both M100 and AC (see FIG. 13), reaching complete removal of the dye from the solution, for both sorbents. In the case of AC, equilibrium is reached in about 30 min, and $k_{AC}$ increases to 3.17×10$^{-3}$ kg g$^{-1}$ min$^{-1}$. Similar values for pseudo second-order kinetic coefficients were reported for adsorption of dyes (0.18-0.38×10$^{-3}$ kg g$^{-1}$ min$^{-1}$) and phenol (2.22-3.46×10$^{-3}$ kg g$^{-1}$ min$^{-1}$) to activated carbon prepared from bagasses, and dyes (0.12-0.88×10$^{-3}$ kg g$^{-1}$ min$^{-1}$) to chitosan. However, for M100, equilibrium and complete removal of the dye are observed after less than 0.5 min. An accurate evaluation of $k_{M100}$ at such fast process is impossible. The complete removal at such short period of time implies that $k_{M100}$≥1.0 kg g$^{-1}$ min$^{-1}$, thus at least three orders of magnitude larger than the sorption rate to AC at the same conditions. Such fast sorption was measured in all experiments performed with M100 concentration larger than 0.25 g l$^{-1}$.

Figure 14:
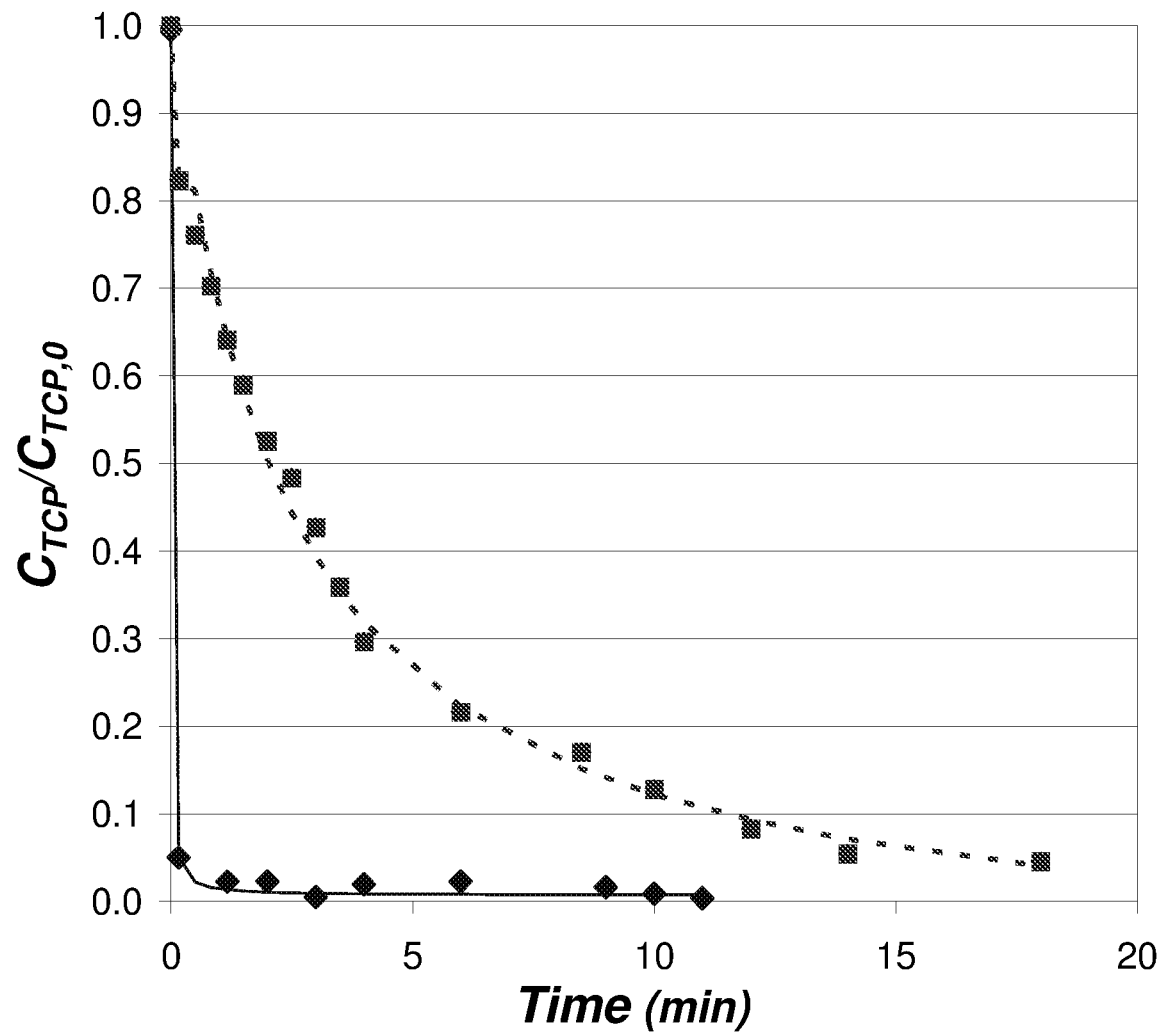
FIG. 14 is a graph showing the ratio of concentration of TCP ($C_{TC}$)) to the initial concentration ($C_{TCP,0}$) as a function of time. Initial sorbent concentration is 0.25 g l$^{-1}$ and $C_{TCP,0}$=20 µM: ■—AC filtered; ◆ M100 filtered; dashed line—AC calculated; full line—M100 calculated.

FIG. 14 shows a similar trend for the adsorption of TCP on M100 and AC, with sorbent amounts of 0.25 g l$^{-1}$ and $C_{EB,0}$=20 μM (16.72 mg l$^{-1}$), performed using the filtering method. As in the EB case, the calculated values for $q_e$ for both sorbents were relatively similar: 15.6 and 17.2 g kg$^{-1}$ for M100 and AC, respectively. The rates of sorption (k) were calculated as from FIG. 14, where 2.45×10$^{-2}$ kg g$^{-1}$ min$^{-1}$ is for AC, with complete adsorption achieved only after more than 20 min; whereas for M100, equilibrium and almost complete removal are observed in less than 0.5 min. To obtain such fast sorption process, $k_{M100}$≥8.2 kg g$^{-1}$ min$^{-1}$, thus at least two orders of magnitude larger than the sorption rate to AC at the same conditions.

The results shown indicate that organoclay particles based on montmorillonite saturated with CV presented sorption rates of EB and a phenolic pollutant at least two orders of magnitude faster than AC. Considering that sorption kinetics is one of the limiting factors in the removal of organic pollutants from water, a fast sorbent such as the organoclay compound might have wide environmental uses.

Combination of the fast sorbent presented herein and a photocatalysis processes might lead to an effective adsorbent that can be used without the need of regeneration.

5.2. Organoclay as a Fast Sorbent for Organic Pollutants

Materials

The clay mineral used was commercial Wyoming Nabentonite (SWy-2) obtained from the Source Clays Repository of The Clay Minerals Society (Columbia, Mo.). The CEC of the clay bentonite is reported as 0.8 mole/kg. Yuncllillos sepiolite was used for the sequential batch experiments, and was provided by TOLSA S.A. (Spain), 2,4,5-TCP (99%), 2-chlorophenol (99%), 4-nitrophenol (98%) and CV (90%) were purchased from Aldrich (Germany), whereas picric acid solution (1.2%), phenol solution (90%) and naphthalene were obtained from Ridley (Riedel-de Haën, Germany), tetraphenylphosphonium chloride (97%) was purchased from Fluka (Swizerland).

Activated carbon: Lyrad powdered and Lyrad HL-820 were purchased from Lyrad chemicals L.T.D. (Israel), Char Coal-C-4386 was purchased from Sigma (Germany) and Chemviron 9107 was obtained from Chemviron carbon (USA). All materials were used without further treatment or purification.

Adsorption isotherms of tetraphenylphosphonium cations (TPP) to SWy-2 were measured as described in Rytwo et al., 1995. The influence of the TPP adsorbed on the electrokinelic particle charge of TPP-organoclay with different loads was measured by a titration with polyelectrolytes using a particle charge detector (MÜTEK; PCD 03).

Organoclay Preparation

Organoclays were prepared by the following procedure: 1 g of SWy-2 clay was added gradually to 200 ml of stirred distilled water, until a homogenous dispersion was achieved. Appropriate amounts of CV or TPP powder were added gradually while stirring and the complex was allowed to reach equilibrium. The organoclay dispersion was used without drying, since preliminary experiments showed that the use of dried organoclay yields slower adsorption kinetics. The amount of organic cation adsorbed was evaluated by measuring CV or TPP concentrations at the supernatant. In all cases more than 99.5% of the added cations were adsorbed. The adsorbents are denoted as CV-organoclay or TPP-organoclay for montmorillonite with CV adsorbed amount 100% of the CEC, or with TPP 70% of the CEC, respectively. Preliminary experiments demonstrated that, at such loads, nor CV neither TPP were released from the complex.

Adsorption Isotherms

Adsorption isotherms were measured in 10 ml glass tubes with plastic screw caps by adding a continuously stirred organoclay suspension (5 g/L), and the appropriate amount of pollutant. The exact amount of organoclay for each adsorption isotherm was adapted to the solubility of the pollutant in case, and kept constant for each pollutant. Distilled water was added to achieve a final volume of 10 ml. Preliminary studies showed that equilibrium was reached in less than a minute. Nevertheless, the tubes were agitated on an orbital shaker for 24 h to ensure equilibrium and then centrifuged at 2000 RPM for 30 min. After centrifugation, the supernatant was measured for the relevant pollutant using a diode-array HP 8452A UV-Visible spectrophotometer. The concentration of the remaining pollutant was determined by the absorbance changes at 244 nm for TCP ($\varepsilon$=8511 $M^{-1}$ $cm^{-1}$), 354 nm peak for PA ($\varepsilon$=13411 $M^{-1}$ $cm^{-1}$), 294 nm peak for 2-chlorophenol (2CP) ($\varepsilon$=4033 $M^{-1}$ $cm^{-1}$), 400 nm peak for 4-nitrophenol (4NP) ($\varepsilon$=18402 $M^{-1}$ $cm^{-1}$), 234 nm peak for phenol ($\varepsilon$=10170 $M^{-1}$ $cm^{-1}$), and 220 nm peak for naphthalene ($\varepsilon$=38670 $M^{-1}$ $cm^{-1}$). The TCP, 2CP, 4NP and phenol were measured in their phenolate form after the pH was raised with NaOH prior to measuring the spectra.

All adsorption experiments were conducted in triplicates at room temperature, and the adsorbed amount was calculated by mass balance. The quality of the analysis was confirmed by testing pollutant recovery using an additional tube with no clay as internal standard. In order to confirm that CV or TPP were not released, the measured spectra were decomposed to individual components by a Matlab code written for that purpose.

Comparative adsorption experiments of TCP on CV organoclay and several activated carbons were prepared following the same procedure.

Column Experiments

To test the efficacy of organoclays in pollutant removal, columns were prepared using tubes with a cross section of 0.454 $cm^2$ and a total volume of 10 $cm^3$. The tubes were filled with mixtures of sand and clay. The sand was added to avoid clogging and ensure relatively fast flow of the effluent. Control columns contained sand and 2% crude SWy-2, and treated columns contained sand and 2% organoclay, based on CV added up to 125% of the CEC. The use of such organoclay was preferred since it was shown that for PA reaches slightly higher adsorbed amounts than clay with CV up to 100% of the CEC. The effluent was PA 0.1 mM solution, flowing at a volume rate of 1.07±0.03 ml $min^{-1}$. Concentration of PA was measured at the outflow as described above, and normalized to the initial concentration. Removal of remaining traces of CV was ensured by adding at the bottom of the treated column about 2 cm of sand mixed with crude clay.

Sequential Batch Experiments

In order to demonstrate the efficacy of such device to remove high concentration and large amounts of pollutants, "sequential batch" experiments were performed using the following procedure: Aliquots of 8 ml 1 mM TCP solution were added to the first of three test tubes containing 0.05 g CV-organoclay suspension and 0.001 g crude sepiolite. Sepiolite was added in order to ensure that no organocation is leached from one test tube to the other. Preliminary experiments determined that TCP does not adsorb on sepiolite. The solution remained in each tube for 2 minutes, and after that the supernatant was separated by short centrifugation. Following separation, 8 ml of the supernatant were moved to the second tube, while 8 ml of polluted solution were added to the first one. Such serial process was followed until relatively high concentrations of TCP (>3 µM) were found after the third test tube. At that stage the first tube was removed, the second became the first, the third became the second, and a new tube with fresh organoclay was added as third.

Results and Discussion

Adsorption of TPP on montmorillonite. Table 2 below shows the amounts of TPP adsorbed, and the electrokinetic charge of the particles as measured by PCD. TPP adsorbs up to approximately 90% of the CEC, and the adsorption neutralizes completely the initial negative charge of the mineral. It should be emphasized that adsorption of CV to the same montmorillonite can reach almost 200% of the CEC (Rytwo et al., 1995) and the charge might reach values of about +0.130 $mol_c$ $kg^{-1}$. However, when the added amounts of CV were close to the CEC, the charge of the particles was close to neutral. Thus, both organoclay platforms presented at this study (CV up to 100% CEC, and TPP up to 70% CEC) yield almost neutral particles, which may potentially be efficient adsorbents for hydrophobic compounds.

TABLE 2

Amounts of TPP adsorbed on montmorillonite and electrokinetic particle charge as a function of the amounts of TPP added and adsorbed

| Amount added | | Amount adsorbed | | | Particle charge |
|---|---|---|---|---|---|
| mole $kg^{-1}$ clay | % CEC | mole $kg^{-1}$ clay | Standard deviation | % CEC | $mole_c kg^{-1}$ |
| 0.00 | 0 | | | | −0.294 |
| 0.40 | 50 | 0.40 | 0.01% | 50.0 | −0.240 |
| 0.48 | 60 | 0.48 | 0.01% | 60.0 | −0.202 |
| 0.56 | 70 | 0.56 | 0.03% | 69.8 | −0.185 |
| 0.64 | 80 | 0.63 | 0.05% | 78.6 | −0.162 |
| 0.72 | 90 | 0.67 | 0.51% | 84.3 | −0.126 |
| 0.80 | 100 | 0.69 | 0.47% | 85.8 | −0.190 |
| 0.88 | 110 | 0.70 | 1.15% | 87.9 | 0.002 |
| 0.96 | 120 | 0.72 | 0.07% | 89.6 | 0.003 |
| 1.04 | 130 | 0.69 | 4.25% | 86.4 | 0.005 |
| 1.12 | 140 | 0.70 | 7.23% | 87.1 | 0.004 |
| 1.20 | 150 | 0.69 | 8.31% | 85.7 | 0.008 |

Adsorption of Pollutants to CV-Organoclay

Figure 15:
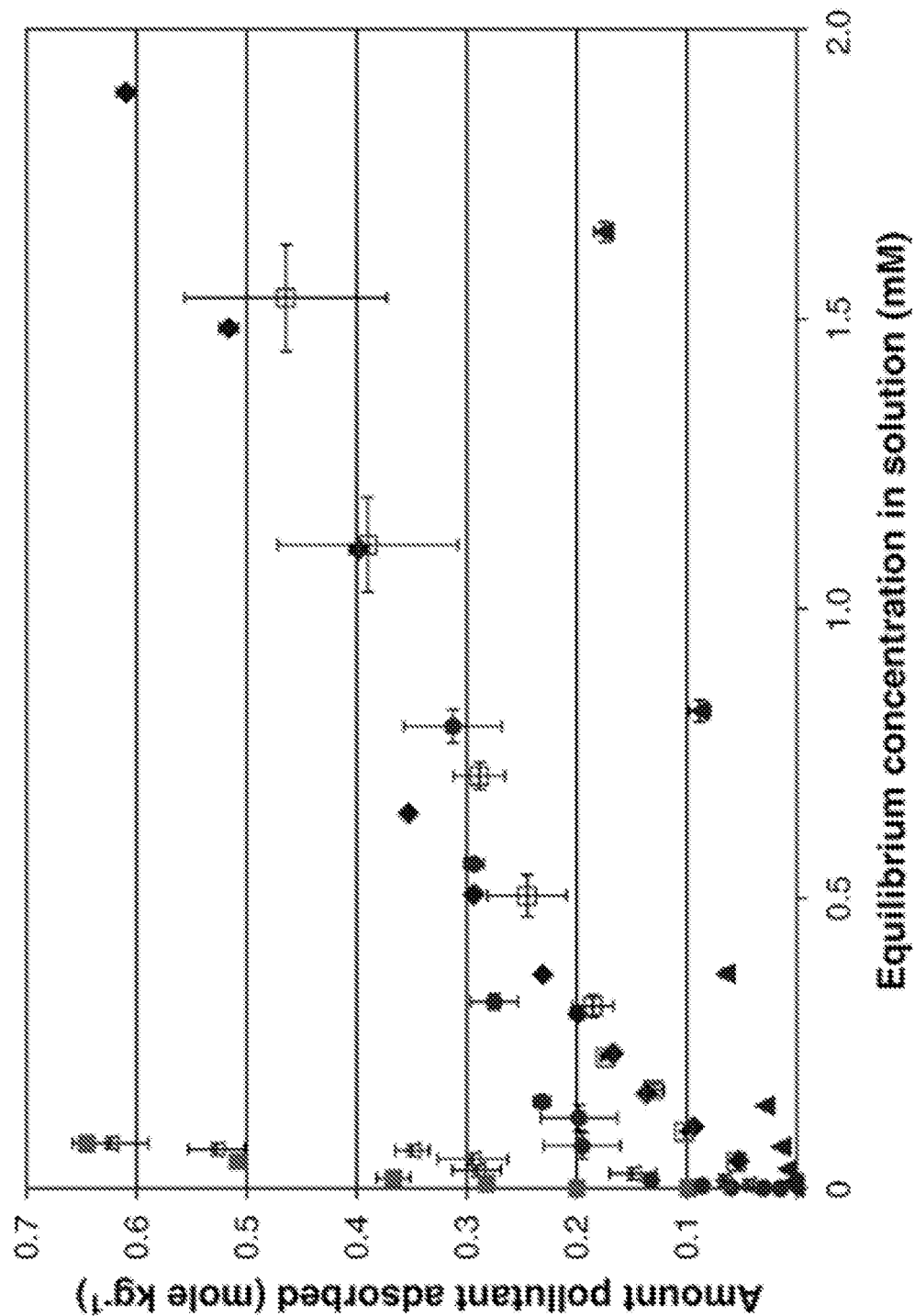
FIG. 15 is a graph showing the adsorption isotherms of 2,4,5-trichlorophenol (full squares), 2-chlorophenol (rhombus), picric acid (circles), 4-nitrophenol (clear squares), phenol (full triangles), and naphthalene (clear triangles) on montmorillonite pre-adsorbed with CV up to 100% of the CEC.

FIG. 15 presents adsorption isotherms of pollutants on montmorillonite modified with CV adsorbed up to 100% of the CEC. The amount of sorbent was varied with each pollutant, according to its solubility. Naphthalene, PA and TCP present H-type isotherms, indicating high affinity between adsorbent and adsorbate. Complete adsorption of both pollutants is observed up to 0.15 and 0.35 mol $kg^{-1}$ PA and TCP, respectively. Adsorption of 2CP and 4NP are of Langmuir type, and reach relatively similar amounts. Adsorption of phenol is relatively low, and shows an almost linear isotherm, which insinuates a partitioning mechanism. The adsorption of the phenolic derivatives presented is significantly higher than presented in the literature for organoclays based on quaternary alkylammonium cations (Mortland et al., 1986; Zhu et al., 2000).

Comparison between CV-Organoclay and Activated Carbons

Figure 16:
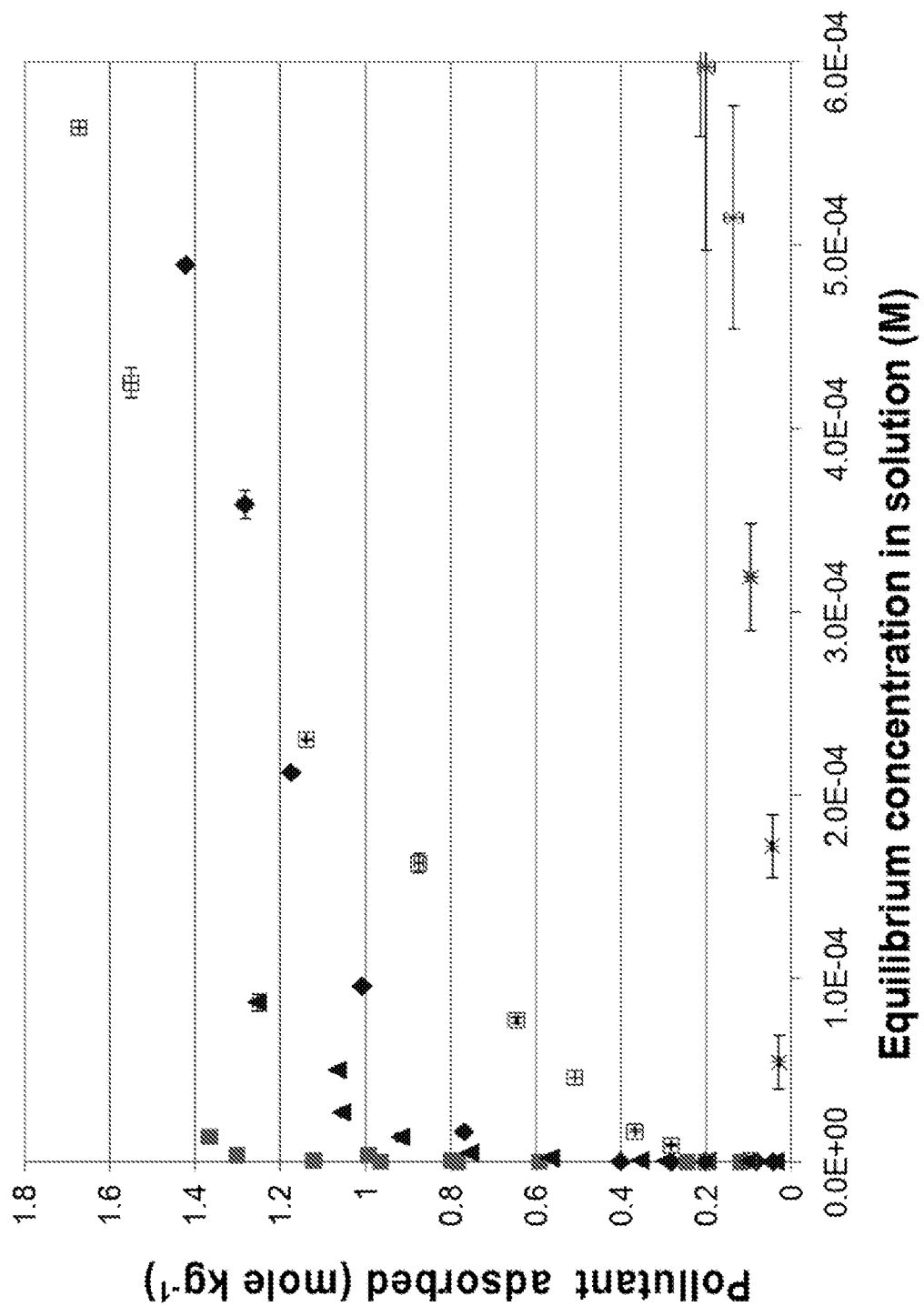
FIG. 16 is a graph showing the adsorption isotherms of 2,4,5-trichlorophenol on Sigma C4386 activated carbon (full squares), Chemviron 9107 activated carbon (rhombus), Lyrad powdered activated carbon (triangles), Lyrad HL820 activated carbon (asterisks), and montmorillonite pre-adsorbed with CVup to 100% of the CEC (clear squares). All sorbents added at 0.05%, except Lyrad HL820 at 0.1%.

Studies on sorption of organoclays are usually compared with results on activated carbon. FIG. 16 presents adsorption isotherm of TCP at an adsorbent content of 0.05%, (0.1% for Lyrad HL820) after 24 h. It should be noticed that the adsorbent content is very low, and this may mislead: for example, by increasing the adsorbent content to 0.5%, all presented adsorbents (except the low quality activated carbon) including CV-organoclay, remove at least 95% of the TCP up to its limit of solubility. On the other hand, FIG. 16 emphasizes the large differences between commercial activated carbons: some of them (Lyrad powdered, Sigma C-4386) adsorb amounts larger than CV-organoclay, Chemviron 9107 leaves less TCP in solution at low concentrations, but reaches a lower capacity when compared with CV organoclay, whereas Lyrad HL-820 removes considerably less pollutant than all other sorbents, even though its content is larger than all of the other adsorbents. Thus, it is almost impossible to compare with "activated carbon" due to the enormous variability in quality and prices of such commercial products, and more details should be given when comparing with such adsorbents.

Even if some activated carbons have a larger capacity than the organoclay, the adsorption kinetics of the organoclays was considerably faster: In all cases equilibrium of the adsorption was achieved in less than a minute, whereas it took tens of minutes for the high quality activated carbons, and hours in the case of Lyrad HL-820. Thus, a fast adsorption rate appears to be the advantage of organoclays, presenting superiority over all activated carbons tested. Such property might be crucial in filtering systems with fast flow rates, which does not allow equilibrium with activated carbon.

Column Experiments

Figure 17:
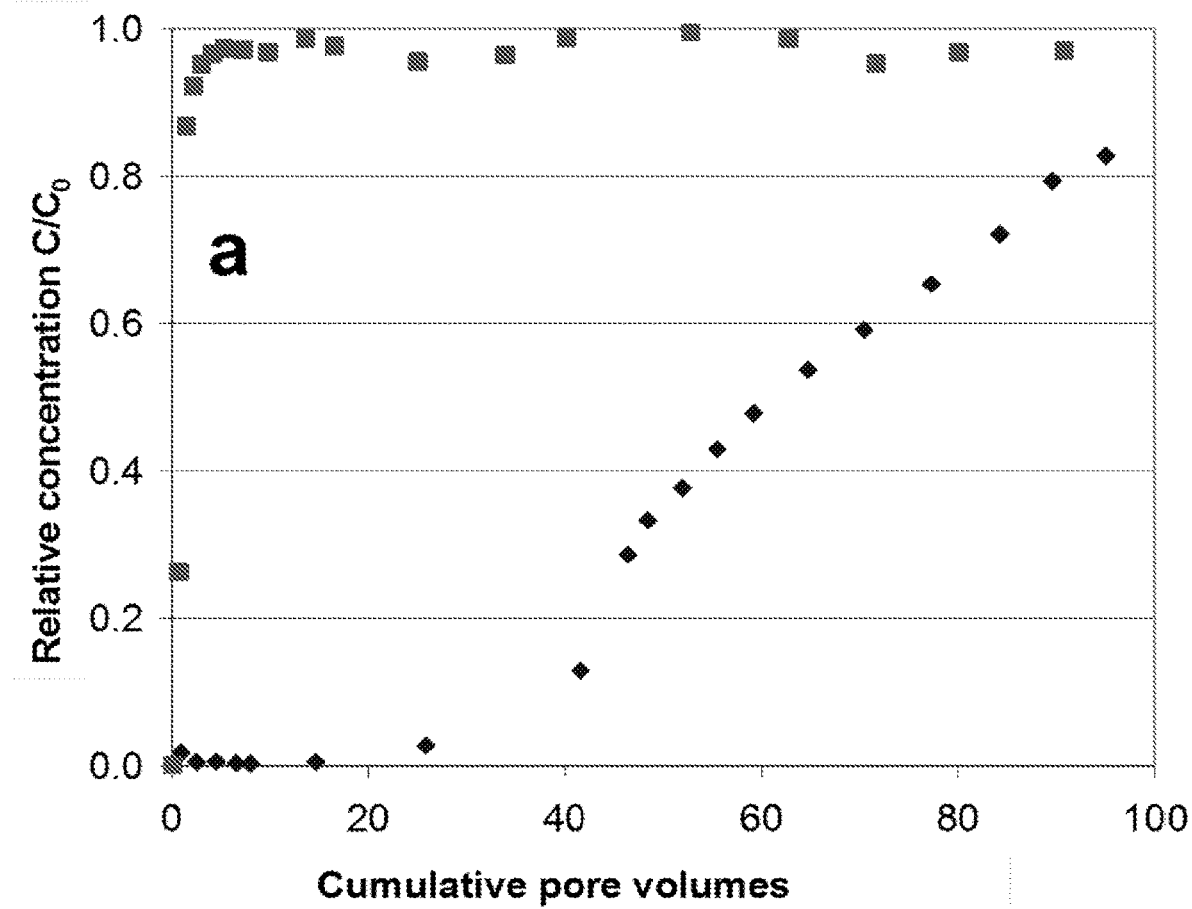
FIG. 17 is a graph showing results of column experiments: breakthrough curve of PA 0.1 mM solution, as a function of the amount of pore volumes. Control columns (squares) contain sand and 2% crude clay. The organoclay-columns (rhombus) contain sand and 2% CV-organoclay as a function.

FIG. 17 shows the ratio of PA concentration in the outflow of the columns to its initial concentration (0.1 mM), as a function of the number of column pore volumes of polluted effluent that has passed through each column. At the control column the pollutant reaches its initial concentration immediately after the first pore volume, indicating that nor sand neither crude clay can retain PA. The organoclay-column shows complete removal up to 26 pore volumes, then decreasing performance. It should be emphasized that by lowering the initial pollutant concentration the volumes of completely clean water increases. Similar results were obtained for other pollutants, and with other CV organoclays. Increasing the degree of saturation of CV above 100% of the CEC yields somehow better filtering results, but might leave traces of CV at the solution. For that purpose, crude clay/sand mixture is added at the bottom of the column, and it removes traces of CV very efficiently.

Adsorption to TPP Organoclay

Even though CV-organoclays shows impressive capacity and very fast adsorption, there are several withdraws which set the path for looking after other organic cations, which may yield similar efficient results. The main withdraw of CV-organoclays is that crystal violet is considered harmful and toxic. Since the target is to prepare a filter that might treat industrial effluents in order to allow its release to the environment, the use of CV at the filtering device might look as an oxymoron. It should be emphasized that such problem is mainly subjective since CV adsorption to montmorillonite up to 100% of the CEC is completely irreversible, and no release of CV is adsorbed at those amounts, even while competing with other dyes which have a large affinity to montmorillonite like methylene blue or acriflavin. However, the toxicity of CV induced the need to find a less hazardous organic cation, which behaves similarly. In this study tetraphenylphosphonium chloride was used, since it is defined as "irritant" only, and the 4 aromatic rings may act as interacting anchors for aromatic pollutants, by means of ring-ring interactions that were observed in the past between cations as benzyl trimethylammonium and aromatic herbicides.

Figure 18:
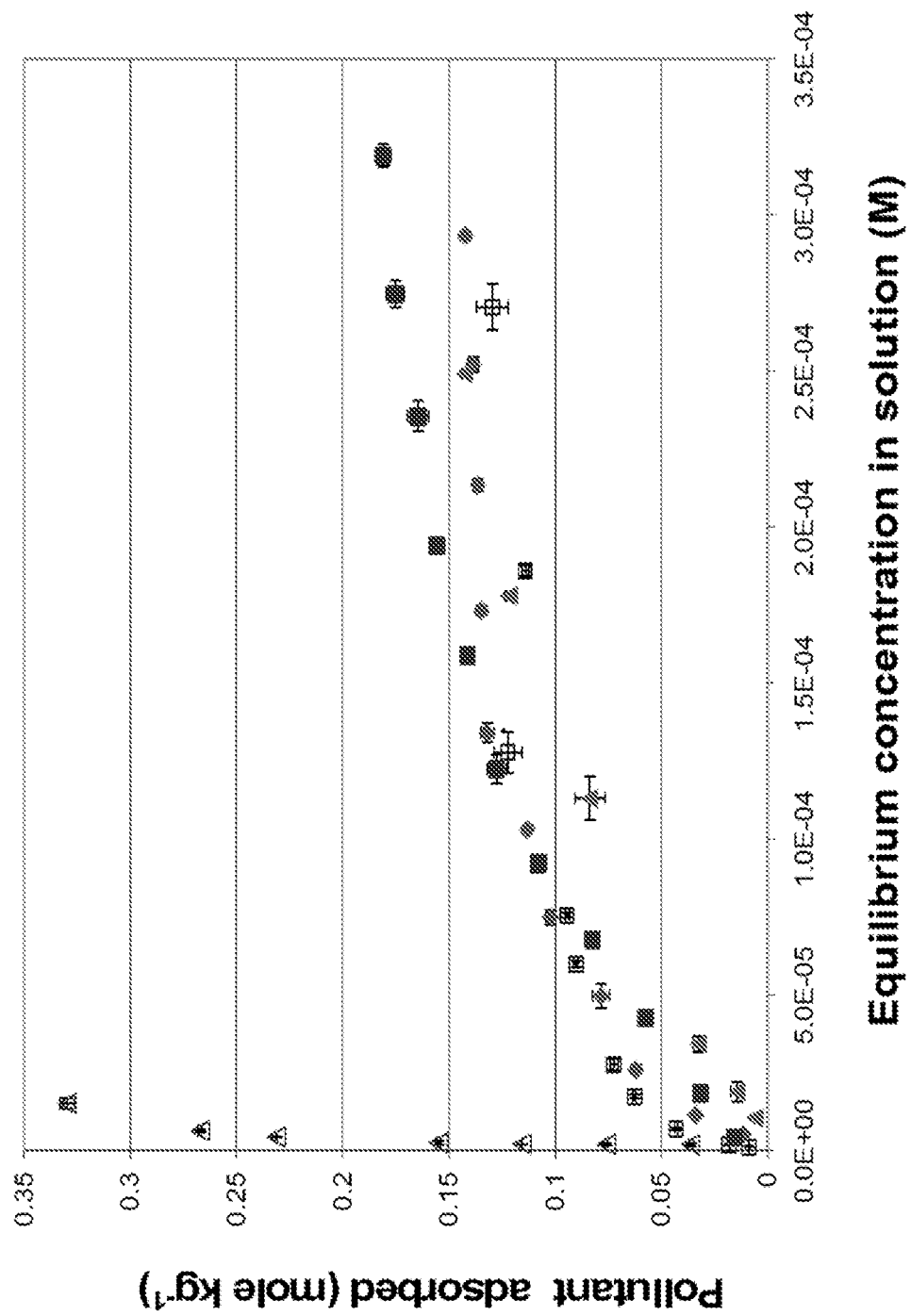
FIG. 18 is a graph showing results of adsorption isotherms of 2,4,5-trichlorophenol (full squares), 2-chlorophenol (rhombus), 4-nitrophenol (clear squares), phenol (full triangles) and naphthalene (clear triangles) on montmorillonite pre-adsorbed with TPP up to 80% of the CEC.

Comparing the adsorption isotherms of several pollutants on TTP- and CV organoclays, the TPP-organoclay is less effective for most pollutants (FIG. 18). 4NP and 2CP show an L-type isotherm, and even TCP which has a large affinity to CV-organoclay (H-type isotherm), presents an L-type isotherm, with incomplete removal. On the other hand, TPP organoclay removes very efficiently naphthalene, with a high affinity isotherm, and leads to complete removal up to 0.25 mol kg$^{-1}$. The remaining naphthalene concentrations in the TPP-organoclay suspensions are lower than those observed for the CV-organoclay suspensions.

Sequential Batch Experiments

Figure 19:
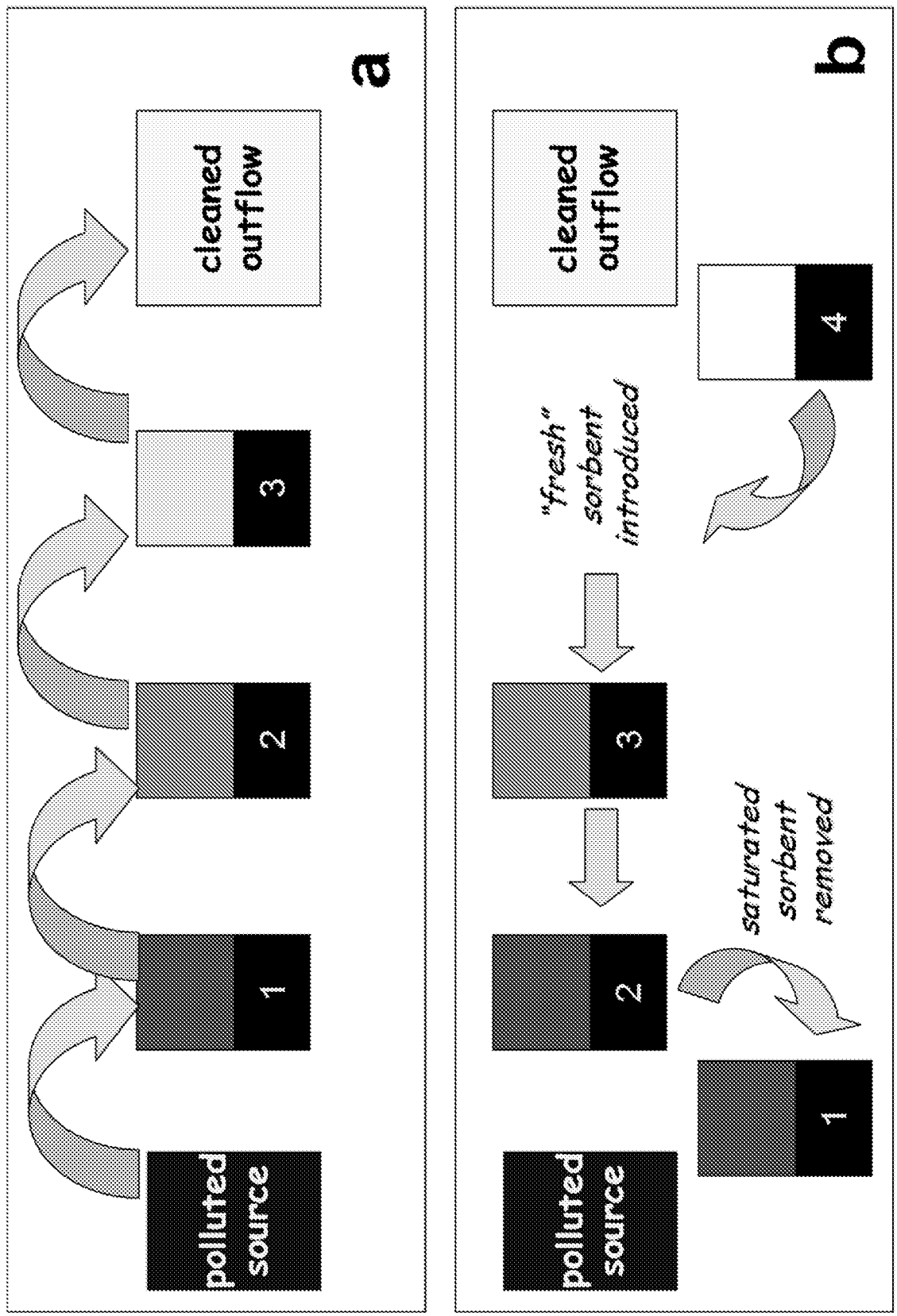
FIG. 19 is a general scheme of sequential batch experiments. (a) Basic purification cycle. (b) Removal of saturated adsorbent, and introduction of "fresh" adsorbent suspension.

In addition to the column experiments, this study presents a technology based on the batch adsorption capacity of the adsorbents, and the ease of separation due to self flocculation, that might be speed up by short and relatively slow centrifugation. FIG. 19 shows a scheme of such purification plant, based on suspensions of organoclay. FIG. 19a shows the basic purification cycle. The polluted effluent is introduced into the first batch vessel, stirred and left to react for a few minutes, and the solids flocculate. The supernatant is drained and introduced to the second vessel, while the first vessel is filled again with polluted solution. After the third vessel the first cycle is ended, as clean effluent with no pollutant is obtained. The process can go on while monitoring the pollutant concentration after the third vessel. When the concentration of the pollutant reaches a limiting value, (FIG. 19b) the highly polluted first vessel is removed, the second vessel is moved to position 1, the third to position 2, and a new vessel containing unpolluted adsorbent is added at position 3.

In the experiment performed, each batch vessel contained a total volume of 10 ml with 5 g L$^{-1}$ CV-clay. Due to the sensitivity to traces left of crystal violet 0.1 g L$^{-1}$ crude sepiolite was added, which might adsorb very large amounts of crystal violet by interactions with charged and neutral sites. The polluted effluent contained very high concentration of TCP (1000 mM). Table 3 below shows the concentration of the effluent after the third vessel. After the 9$^{th}$ cycle, when the pollutant concentration reached more than 3 μM, a new vessel was introduced, as described above (FIG. 19b). It should be emphasized that the concentration was even then almost three orders of magnitude lower than the initial polluted effluent.

TABLE 3

TCP concentration after the third vessel of the sequential batch purification experiment

| Cycle | Concentration [μM] |
| --- | --- |
| 1 | ND |
| 2 | ND |
| 3 | ND |
| 4 | ND |
| 5 | 0.75 |
| 6 | 0.06 |
| 7 | ND |
| 8 | 1.12 |
| 9 | 3.45 |
| 10 | ND |
| 11 | ND |
| 12 | 0.10 |
| 13 | ND |
| 14 | 0.79 |
| 15 | 1.40 |

Initial pollutant concentration was 1000 μM.
ND indicated that TCP concentration is lower than the limit of detection (0.05 μM).

The experiment was stopped after 15 cycles. This procedure removed almost completely TCP from a highly polluted solution, by using only the amount of adsorbent in 4 vessels. Only about 0.25 g CV organoclay were needed to clean approximately 150 ml of effluent. Thus, 1 kg of organoclay will be able to clean more than 0.5 m$^3$ of highly polluted effluent. It should be emphasized that in most cases the concentration of pollutants is considerably lower. It is obvious that at lower pollutant concentrations the volume cleaned by 1 kg of organoclay will increase considerably.

Conclusions

Organoclays might be efficiently used for the removal of several priority pollutants. Batch experiments show that amounts removed are at least of the same order of magnitude than those obtained by high quality activated carbons, and exhibits considerably faster kinetics. Different organoclays have different affinities to pollutants. Whereas CV-organoclay is more effective for TCP and PA; TPP-organoclay more efficiently removes naphthalene. Thus, combination of adsorbents at different stages might be the key to optimize the environmental suitability. This study presents two related purification techniques: filtering in columns and sequential batch adsorption. Comparison of the total amount of pollutant removed reveals clear advantage of the second technique. This advantage is ascribed to three main factors: (i) The relatively larger time of contact between the polluted solution and the adsorbent particles: the pollutants reach equilibrium with the adsorbent instead of flowing through it, as in a column filters; (ii) The first "cell" treats the highly polluted effluent, while the last vessel releases clean water since it faces low concentrations, which are relatively easily removed. Such differentiation allows to exhaust the whole adsorbent in each compartment to the highest extent, thus maximizes the efficiency of adsorption per gram of organoclay; and (iii) The fact that the adsorbent is not dried at any time avoids the formation of tight flocs with unavailable sorbing surfaces. Thus, the "sequential batch" technique appears to have higher potential of adsorption, even though it needs a more complicated technical setup and constant monitoring. For industrial uses, such purification device based on a fast adsorbing organoclay as active component will be able to yield large amounts of pollutant removed over a relatively smaller amount of adsorbent.

REFERENCES

Benotti, M. J. et al., Water Res., 2009, 43:1513-1522.
Chong, M. N. et al., Water Res., 2010, 44, 2997-3027.
He, H. Y., Int. J. Environ. Res., 2008, 2(1), 23-26.
Meng, Y. et al., Desalination, 2005, 181, 121-133.
Moctezuma, E. et al., J. Hazard. Mater., 2012, 243, 130-138.
Mortland M. M. et al., Clays Clay Miner., 1986, 34(5): 581-585.
Mozia, S. et al., Applied Catalysis B: Environmental, 2005, 59, 131-137.
Pozzo, R. L. et al., Catal. Today, 2000, 62, 175e187.
Rytwo G. et al., Soil Sci. Soc. Am. 1995, 59: 554-564.
Rytwo, G. and Gonen, Y., Desalination and Water Treatment, 2009, 11: 318-323.
White, D. P., 2003 Chemistry, The Central Science $9^{th}$ Ed. Chapter 14, Chemical Kinetics, Prentice-Hall.
Zhu L. et al., Environ. Sci. Technol., 2000, 34: 468-475.

The invention claimed is:

1. A system for treatment of a polluted effluent, said system comprising:
 a. an outer chamber configured to treat an effluent/catalyst mixture comprising the polluted effluent in mixture with a purification slurry comprising particles of one or more catalysts and/or organoclays, or a mixture thereof, wherein the treatment of the effluent/catalyst mixture is carried out by a contact between the particles of one or more catalysts and/or organoclays or the mixture thereof and the polluted effluent to mineralize or degrade pollutants in the polluted effluent, said outer chamber comprising:
   (i) a stirrer comprising an engine, configured to mix the polluted effluent and the purification slurry to prevent said particles from sinking without causing a turbulence;
   (ii) a membrane located at the top of the outer chamber through which a treated effluent passes, while preventing said particles of one or more catalysts and/or organoclays from exiting the outer chamber together with the treated effluent;
   (iii) a membrane cleaning system configured to remove and collect said particles of one or more catalysts and/or organoclays accumulated on the membrane, and re-introducing said particles of one or more catalysts and/or organoclays back to the bottom of the outer chamber, said membrane cleaning system comprises:
     (1) a suction configured to create a vacuum that sucks the particles of one or more catalysts and/or organoclays that accumulate on the membrane, and remove said particles of one or more catalysts and/or organoclays accumulated on the membrane by inversion of a flow direction of the effluent/catalyst mixture;
     (2) an engine configured to rotate said suction across said membrane; and
     (3) a collector configured to collect the removed particles, which is fluidly connected to said suction;
   (iv) at least one inlet located at the bottom of the outer chamber, from which the polluted effluent and/or purification slurry enters the outer chamber; and
   (v) an outlet at the top of the outer chamber from which the treated effluent exits the outer chamber; and
 b. a computerized control system configured to control a speed of flow of both the effluent and the purification slurry, and monitoring a pollutant(s) level in the treated effluent.

2. The system of claim 1, further comprising an inner chamber located inside the outer chamber, said inner chamber holding a lamp for light-treatment of the polluted effluent by photocatalysis.

3. The system according to claim 2, wherein:
 a. said outer chamber is configured to treat an effluent/catalyst mixture comprising the polluted effluent in mixture with a purification slurry comprising particles of one or more catalysts, wherein the treatment of the effluent/catalyst mixture is carried out by a contact between the particles of one or more catalysts and the polluted effluent to mineralize or degrade pollutants in the polluted effluent, said outer chamber comprising:
   (i) said stirrer;
   (ii) said membrane at the top of the outer chamber;
   (iii) said membrane cleaning system;
   (iv) said at least one inlet located at the bottom of the chamber, from which the polluted effluent and/or catalyst slurry enters the outer chamber;
   (v) said outlet at the top of the outer chamber from which the treated effluent exits the outer chamber;
   (vi) at least one inlet located at the bottom of the outer chamber, to which auxiliary compounds and/or oxygen pumps may be attached; and
   (vii) an opening configured to hold sensors monitoring the performance of the system;
 b. a transparent inner chamber configured to hold a lamp, located inside the outer chamber; and c. said computerized control system configured to control the speed of flow of both the effluent and the catalyst(s) slurry, and monitoring the pollutant(s) level in the treated effluent.

4. The system of claim 1, wherein the treated effluent exiting from the outlet at the top of the outer chamber is returned to the at least one inlet at the bottom of the outer chamber for retreatment.

5. The system of claim 1, wherein the membrane has a pore size of from about 0.2 to about 1.5 microns.

6. The system of claim 1, wherein the engine of the stirrer and the engine of the membrane cleaning system are the same engine.

7. The system of claim 1, wherein the membrane cleaning system further comprises a rotating brush or wiper connected to the suction configured to physically remove the particles of one or more catalysts and/or organoclays accumulated on the membrane.

8. The system of claim 7, wherein said brush or wiper is hollow and constitutes the termini of the suction.

9. The system of claim 1, wherein said tube fluidly connected to the collector in the membrane cleaning system allows to transfer the collected particles of one or more catalyst(s) and/or organoclays to the bottom of the outer chamber through the purification-slurry inlet or through a secondary inlet.

10. The system of claim 2, comprising openings configured to hold sensors monitoring the performance of the system, wherein said sensors measure one or more of pH, temperature, and electrical conductivity of the effluent; catalyst(s) and/or organoclays concentration; pollutant concentration; light intensity; redox potential; oxygen concentration; and $CO_2$ concentration.

11. The system of claim 2, wherein said computerized control system controls the speed of flow of the polluted effluent entering the system, the amount of purification-slurry entering the system, a stirring speed, a quantity of air blown into the outer chamber, an addition of auxiliary compound(s), and a light wavelength and intensity.

12. The system of claim 1, wherein said outer chamber further comprises inlet(s) configured to add auxiliary compounds into the outer chamber; and/or an opening configured to hold sensors monitoring a performance of the system.

13. An array of systems for treatment of a polluted effluent, said array of systems comprising at least two systems according to claim 1 connected in tandem.

14. The array of systems of claim 13, wherein each system is designed to treat a different pollutant.

15. The array of systems of claim 13, wherein each system of said array of systems comprises a different catalyst and/or organoclay and/or lamp and/or auxiliary compounds.

16. A method for treating a polluted effluent in the system according to claim 1, comprising:
a) filtering the polluted effluent to remove large particles;
b) pumping the polluted effluent filtered in a) above to the bottom of the outer chamber;
c) pumping the purification-slurry to the bottom of the outer chamber;
d) mixing the polluted effluent and the purification-slurry in the outer chamber without causing a turbulence;
e) if a lamp is present, turning a light on and exposing the purification-slurry/effluent mixture to light;
f) monitoring the pollutant(s) concentration in the purification-slurry/effluent mixture in the outer chamber and in the treated effluent exiting the outer chamber;
g) pumping the auxiliary compounds and oxygen into the outer chamber as needed;
h) cleaning the membrane by removing therefrom particles of catalysts and/or organoclays, and transferring them to the bottom of the outer chamber or to a collection chamber; and
i) discharging the treated effluent exiting from the outer chamber to a suitable system, or returning the treated effluent to the bottom of the outer chamber for retreatment.

17. The method of claim 16, wherein a concentration of the catalyst(s) and/or organoclay(s) in the outer chamber is essentially constant throughout the entire chamber.

18. A method for treatment of a polluted effluent in the array of systems of claim 13, comprising:
a) filtering the polluted effluent to remove large particles;
b) pumping the polluted effluent filtered in a) above to the bottom of a first outer chamber;
c) pumping the purification-slurry to the bottom of the first outer chamber;
d) mixing the polluted effluent and purification-slurry in the outer chamber without causing a turbulence;
e) if present, turning a light on and exposing the purification-slurry/effluent mixture to the light;
f) monitoring the pollutant(s) concentration in the purification-slurry/effluent mixture in the outer chamber and in the treated effluent exiting the outer chamber;
g) pumping the auxiliary compounds and oxygen into the outer chamber as needed;
h) cleaning the membrane by removing therefrom particles of catalysts and/or organoclays, and transferring them to the bottom of the outer chamber;
i) transferring the treated effluent to the outer chamber of a subsequent system for a retreatment or for a treatment different from said treatment with another catalyst and/or another organoclay and/or different light source and wavelength;
j) repeating i) above as needed and according to the number of systems in the array of systems; and
k) discharging the treated effluent exiting from the outer chamber of the last system to a suitable system.

* * * * *